US011868332B2

(12) United States Patent
Zhou et al.

(10) Patent No.: US 11,868,332 B2
(45) Date of Patent: Jan. 9, 2024

(54) DATA INDEX ESTABLISHMENT METHOD, AND APPARATUS

(71) Applicant: Huawei Cloud Computing Technologies Co., Ltd., Guizhou (CN)

(72) Inventors: Wenli Zhou, Xi'an (CN); Mingchang Wei, Shenzhen (CN); Jiangbo Liu, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 265 days.

(21) Appl. No.: 17/236,573

(22) Filed: Apr. 21, 2021

(65) Prior Publication Data
US 2021/0240688 A1   Aug. 5, 2021

Related U.S. Application Data

(63) Continuation of application No. PCT/CN2019/097473, filed on Jul. 24, 2019.

(51) Int. Cl.
*G06F 16/22* (2019.01)

(52) U.S. Cl.
CPC ................ *G06F 16/2282* (2019.01)

(58) Field of Classification Search
CPC .................................. G06F 16/2282
See application file for complete search history.

(56) References Cited

U.S. PATENT DOCUMENTS

| 5,758,145 | A | 5/1998 | Bhargava et al. | |
|---|---|---|---|---|
| 2010/0299339 | A1 | 11/2010 | Kementsietsidis et al. | |
| 2012/0221509 | A1* | 8/2012 | Gao | G06F 16/254 |
| | | | | 707/602 |
| 2013/0007008 | A1* | 1/2013 | Yuan | G06F 16/13 |
| | | | | 707/769 |
| 2015/0205885 | A1* | 7/2015 | Zhou | G06F 16/81 |
| | | | | 707/742 |
| 2016/0092541 | A1* | 3/2016 | Liu | G06F 16/278 |
| | | | | 707/715 |

(Continued)

FOREIGN PATENT DOCUMENTS

| CN | 103823865 A | 5/2014 |
|---|---|---|
| CN | 104268280 A | 1/2015 |

(Continued)

OTHER PUBLICATIONS

Du, Q., et al., "A Novel KNN Join Algorithms based on Hilbert R-tree in MapReduce", 2013 3rd International Conference on Computer Science and Network Technology, 4 pages.

(Continued)

*Primary Examiner* — Muluemebet Gurmu
(74) *Attorney, Agent, or Firm* — Conley Rose, P.C.

(57) ABSTRACT

A data index establishment method obtains M raw data segments and a first-layer mapping relationship through segment fitting on raw data in a raw data table, and further obtains N first key segments and a second-layer mapping relationship through segment fitting on a first key of each raw data segment. In a subsequent data query process, a multi-layer mapping relationship is input from a to-be-queried key sequentially in descending order, until a location of the to-be-queried key in the raw data table is located.

17 Claims, 20 Drawing Sheets

(56) References Cited

U.S. PATENT DOCUMENTS

2019/0087461 A1* 3/2019 Hu .................. G06F 16/221
2020/0293532 A1* 9/2020 Uzar ................ G06F 16/24542

FOREIGN PATENT DOCUMENTS

| | | |
|---|---|---|
| CN | 104794123 A | 7/2015 |
| CN | 107515882 A | 12/2017 |
| CN | 108256076 A | 7/2018 |
| CN | 108629196 A | 10/2018 |
| CN | 109471863 A | 3/2019 |
| WO | 2017036547 A1 | 3/2017 |

OTHER PUBLICATIONS

Kamel, I., et al., "On packing R-trees", Information and Knowledge Management, ACM, 2 Penn Plaza, Suite 701 New York NY 10121-0701 USA, Dec. 1, 1993, 10 pages.

Kraska, T., et al., "The Case for Learned Index Structures," Apr. 30, 2018, 30 pages.

* cited by examiner

Ordered raw data table

| Key | Value | | Location |
|---|---|---|---|
| 0001 | XX | → | 1 |
| 0002 | XX | | 2 |
| 0003 | XX | | 3 |
| 0007 | XX | | 4 |
| 0008 | XX | | 5 |
| 0010 | XX | | 6 |
| 0019 | XX | | 7 |
| ... | ... | | ... |
| 0158 | XX | | 102 |
| 0159 | XX | | 103 |
| 0165 | XX | | 104 |
| 0178 | XX | | 105 |
| 0180 | XX | | 106 |
| ... | ... | | ... |
| 9980 | XX | | 8500 |

FIG. 4

Ordered raw data table

| Key | Value |
|---|---|
| 0001 | XX |
| 0002 | XX |
| 0003 | XX |
| 0007 | XX |
| 0008 | XX |
| 0017 | XX |
| 0019 | XX |
| ... | ... |
| 0158 | XX |
| 0159 | XX |
| 0165 | XX |
| 0178 | XX |
| 0180 | XX |
| ... | ... |
| 9980 | XX |

First segment: $F_{11} = k_{11}x + b_{11}$

Second segment: $F_{12} = k_{12}x + b_{12}$

...

$M^{th}$ segment: $F_{1M} = k_{1M}x + b_{1M}$

FIG. 6

DATA INDEX ESTABLISHMENT METHOD, AND APPARATUS

CROSS-REFERENCE TO RELATED APPLICATIONS

This is a continuation of Int'l Patent App. No. PCT/CN2019/097473, filed on Jul. 24, 2019, which is incorporated by reference.

FIELD

This disclosure relates to the field of computer technologies, and in particular, to a data index establishment method, and an apparatus and a device for performing the method.

BACKGROUND

Database and big data fields, and other fields require for quick data search. An index may usually be constructed for data to improve subsequent data search efficiency, for example, a B tree or a B+ tree may be constructed for the data as the index.

The B+ tree needs to be constructed for the data according to a fixed rule. However, when the index is constructed, a characteristic of the data is unrelated to the rule used to construct the index. In addition, the index constructed according to the fixed rule needs to occupy a large amount of space.

SUMMARY

Embodiments provide a data index establishment method, so that a data index established by using the method has low complexity and occupies small storage space.

A first aspect provides a data index establishment method, including: obtaining a raw data table, where the raw data table includes a plurality of pieces of raw data, and each piece of raw data includes a key and a value; segmenting the plurality of pieces of raw data based on keys of the plurality of pieces of raw data to obtain M raw data segments and M first mapping relationships, where each first mapping relationship indicates a correspondence between a key of one raw data segment and a location of the key of the raw data segment in the raw data table; obtaining a first key of each of the M raw data segments; and segmenting obtained M first keys to obtain N first key segments and N second mapping relationships, where each second mapping relationship indicates a correspondence between a first key of one first key segment and an identifier of a first mapping relationship of a source data segment of the first key of the first key segment, the first key of the first key segment is obtained from the source data segment, M is an integer greater than 1, and N is an integer greater than or equal to 1.

According to the method, in the two segmentation processes, the mapping relationships are obtained based on the location of the key of the raw data in the raw data table. Therefore, the two mapping relationships are obtained based on a characteristic of the raw data, and do not depend on a fixed index establishment rule. The mapping relationship obtained by using the method occupies small storage space and has low complexity.

In a possible implementation, each first mapping relationship includes a first monotone function, input of the first monotone function is a key, and output of the first monotone function is a location of the key in the raw data table.

In a possible implementation, each second mapping relationship includes a second monotone function, input of the second monotone function is a key, and output of the second monotone function is an identifier of one first mapping relationship.

The monotone function indicates a function whose dependent output variable increases (or decreases) as an independent input variable increases (or decreases) within a defined interval.

In a possible implementation, if a second-layer mapping relationship (the second mapping relationship) still needs to be further segmented, the method further provides a manner of obtaining a third mapping relationship, including: obtaining a first key of each of the N first key segments; and segmenting obtained N first keys of the N first key segments to obtain first keys of J first key segments and J third mapping relationships, where each third mapping relationship indicates a correspondence between a first key of one first key segment and an identifier of one second mapping relationship, and j is an integer greater than or equal to 1.

If the second mapping relationship still needs to be further segmented (when N is greater than 1), the first key of each of the N first key segments may further be extracted for the segmentation. A raw data index is formed based on more layers of mapping relationships, to further improve subsequent data search efficiency.

In a possible implementation, the method is applicable to a database, the raw data table is obtained from the database, and the method further includes: storing the M first mapping relationships and the N second mapping relationships into a memory.

In a possible implementation, after the index is established, the embodiments further provide a method for querying a key in the raw data table based on the obtained mapping relationship, including: obtaining a to-be-queried key; determining, based on the to-be-queried key and the N second mapping relationships, a first mapping relationship corresponding to the to-be-queried key; and obtaining, based on the to-be-queried key and the determined first mapping relationship corresponding to the to-be-queried key, a location of the to-be-queried key in the raw data table.

A quantity of pieces of raw data included in each mapping relationship is usually far greater than a quantity of fan-outs of a conventional data index (for example, a B+ tree). Therefore, in a process of locating the to-be-queried key in the raw data table based on a multi-layer mapping relationship, a quantity of operations that need to be performed is small, and the query efficiency is high.

A second aspect provides an index-based data query method, including: obtaining a to-be-queried key; gaining access to a second mapping relationship stored in a memory, determining, based on the second mapping relationship and the to-be-queried key, an identifier of a first mapping relationship corresponding to the to-be-queried key, where the second mapping relationship indicates a correspondence between the to-be-queried key and the identifier of the first mapping relationship of the to-be-queried key in a source data segment; and gaining access to, based on the determined identifier of the first mapping relationship corresponding to the to-be-queried key, the first mapping relationship that corresponds to the to-be-queried key and that is stored in the memory, to obtain a location of the to-be-queried key in a raw data table, where the first mapping relationship indicates a correspondence between a key of one raw data segment and a location of the key of the raw data segment in the raw data table.

In an implementation, if the memory further stores a third mapping relationship, before the gaining access to the second mapping relationship, the method further includes: gaining access to the third mapping relationship stored in the memory, and determining, based on the third mapping relationship, an identifier of the second mapping relationship corresponding to the to-be-queried key.

According to the provided data query method, the location of the to-be-queried key in the raw data table may be determined based on a multi-layer mapping relationship and specific quantity of operations. A quantity of operations is equal to a quantity of layers of mapping relationships. This improves data query efficiency.

A third aspect provides a data processing apparatus, including: an data table storage module configured to store a raw data table, where the raw data table includes a plurality of pieces of raw data, and each piece of raw data comprises a key and a value; an index creation module configured to: obtain the raw data table; segment the plurality of pieces of raw data based on keys of the plurality of pieces of raw data to obtain M raw data segments and M first mapping relationships, where each first mapping relationship indicates a correspondence between a key of one raw data segment and a location of the key of the raw data segment in the raw data table, and M is an integer greater than 1; obtain a first key of each of the M raw data segments; and segment obtained M first keys to obtain N first key segments and N second mapping relationships, where each second mapping relationship indicates a correspondence between a first key of one first key segment and an identifier of a first mapping relationship of a source data segment of the first key of the first key segment, the first key of the first key segment is obtained from the source data segment, and N is an integer greater than or equal to 1; and an index storage module configured to store the M first mapping relationships and the N second mapping relationships.

In a possible implementation, each first mapping relationship includes a first monotone function, input of the first monotone function is a key, and output of the first monotone function is a location of the key in the raw data table.

In a possible implementation, each second mapping relationship includes a second monotone function, input of the second monotone function is a key, and output of the second monotone function is an identifier of one first mapping relationship.

In a possible implementation, the index creation module is further configured to: obtain a first key of each of the N first key segments; and segment obtained N first keys of the N first key segments to obtain first keys of J first key segments and J third mapping relationships, where each third mapping relationship indicates a correspondence between a first key of one first key segment and an identifier of one second mapping relationship; and j is an integer greater than or equal to 1; and the index storage module is further configured to store the J third mapping relationships.

In a possible implementation, the data processing apparatus further includes a data query module. The data query module is configured to: obtain a to-be-queried key; determine, based on the to-be-queried key and the N second mapping relationships, a first mapping relationship corresponding to the to-be-queried key; and obtain, based on the to-be-queried key and the determined first mapping relationship corresponding to the to-be-queried key, a location of the to-be-queried key in the raw data table.

A fourth aspect provides a computing device system. The system includes at least one computing device. Each computing device includes a processor and a memory. The processor of the at least one computing device is configured to: obtain a raw data table; where the raw data table includes a plurality of pieces of raw data, and each piece of raw data includes a key and a value; segment the plurality of pieces of raw data based on keys of the plurality of pieces of raw data to obtain M raw data segments and M first mapping relationships, where each first mapping relationship indicates a correspondence between a key of one raw data segment and a location of the key of the raw data segment in the raw data table, and M is an integer greater than 1; obtain a first key of each of the M raw data segments; segment obtained M first keys to obtain N first key segments and N second mapping relationships, where each second mapping relationship indicates a correspondence between a first key of one first key segment and an identifier of a first mapping relationship of a source data segment of the first key of the first key segment, the first key of the first key segment is obtained from the source data segment, and N is an integer greater than or equal to 1; and store the M first mapping relationships and the N second mapping relationships into the memory.

In a possible implementation, the processor of the at least one computing device is further configured to: obtain a first key of each of the N first key segments; segment obtained N first keys of the N first key segments to obtain first keys of J first key segments and J third mapping relationships, where each third mapping relationship indicates a correspondence between a first key of one first key segment and an identifier of one second mapping relationship, and j is an integer greater than or equal to 1; and store the j third mapping relationships into the memory.

In a possible implementation, the processor of the at least one computing device is further configured to obtain a to-be-queried key; determine, based on the to-be-queried key and the N second mapping relationships, a first mapping relationship corresponding to the to-be-queried key; and obtain, based on the to-be-queried key and the determined first mapping relationship corresponding to the to-be-queried key, a location of the to-be-queried key in the raw data table.

The processor in any one of the foregoing implementations may include a central processing unit (CPU), an application-specific integrated circuit (ASIC), or a CPU and an ASIC.

A fifth aspect provides a data processing apparatus. Different from the data processing apparatus provided in the third aspect, the data processing apparatus provided in the fifth aspect is configured to store the data index obtained in the method provided in the first aspect for subsequent use. The data processing apparatus includes a data table storage module and an index storage module. The data table storage module is configured to store a raw data table. The raw data table includes a plurality of pieces of raw data. Each piece of raw data comprises a key and a value. The raw data table includes M raw data segments. Each raw data segment includes at least one piece of raw data. The index storage module is configured to store M first mapping relationships and N second mapping relationships. Each first mapping relationship indicates a correspondence between a key of one raw data segment and a location of the key of the raw data segment in the raw data table, where M is an integer greater than 1. A first key of each raw data segment is segmented into N first key segment. Each second mapping relationship indicates a correspondence between a first key of one first key segment and an identifier of a first mapping relationship of a source data segment of the first key of the first key segment. The first key of the first key segment is obtained from the source data segment, where N is an integer greater than or equal to 1.

A sixth aspect provides a computer program product including an instruction. When the computer program product runs on a computing device, the computing device is enabled to perform the method in the foregoing aspects. The computer program product may be specifically a software installation package. If any method provided in the foregoing needs to be used, the computer program product may be downloaded, and the computer program product may be executed on the computing device.

A seventh aspect provides a non-transient readable storage medium. The non-transient readable storage medium stores an instruction. When the readable storage medium is executed by a computing device, the computing device performs any method provided above. The storage medium stores a program. The storage medium includes but is not limited to a volatile memory, for example, a random-access memory (RAM), or a non-volatile memory, such as a flash memory, a hard-disk (HDD), and a solid-state drive (SSD).

BRIEF DESCRIPTION OF THE DRAWINGS

FIG. 4 is a schematic diagram of a structure of an ordered raw data table.

FIG. 6 is another schematic diagram of a segmentation result of raw data.

DETAILED DESCRIPTION

The following describes technical solutions with reference to accompanying drawings.

A data index establishment method and an index-based data query method may be applicable to the fields such as storage, a database, and big data. A data index indicates information that is generated based on data and that is used to locate a location of the data during data query. The data index includes a first mapping relationship and a second mapping relationship mentioned below, and may further include a third mapping relationship and another mapping relationship.

Figure 1A:
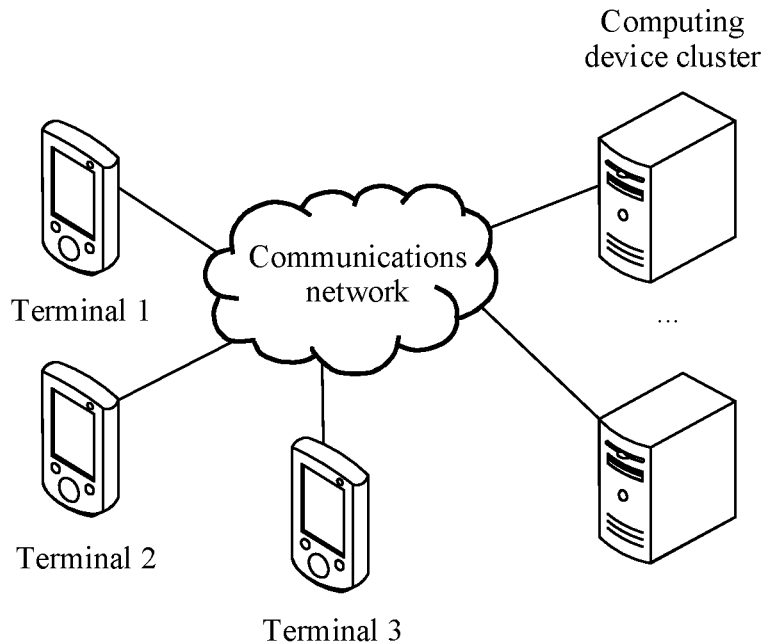
FIG. 1A is a schematic diagram of a structure of a data processing system.

For example, a data processing system is shown in FIG. 1A. A computing device cluster (including at least one computing device) is connected to one or more terminals, such as a terminal 1, a terminal 2, and a terminal 3 shown in FIG. 1A. The terminal may be, for example, a cellular phone, a smart phone, a personal digital assistant (PDA), a tablet computer, a laptop computer, a personal computer (PC), or a computing device deployed on a user side.

Figure 1B:
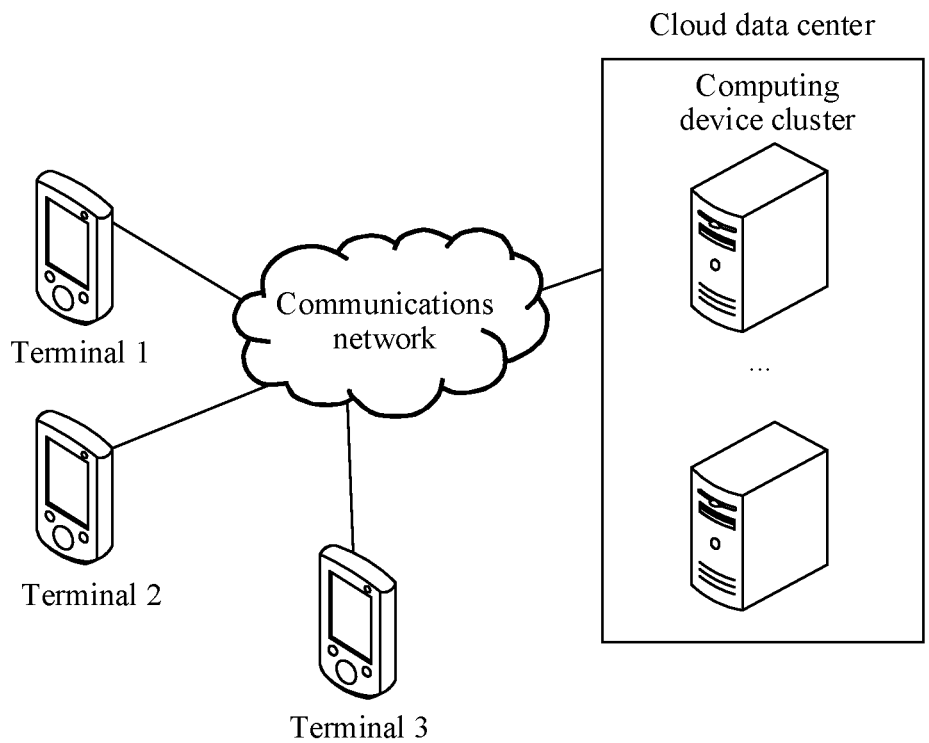
FIG. 1B is a schematic diagram of a structure of another data processing system.

As shown in FIG. 1B, the computing device cluster may be deployed in a cloud data center. A cloud operator provides a data storage service, a database service, or a big data service for a user.

In the foregoing scenario, the computing device cluster may connect to the terminal by using a communications network. The communications network may be a wired communications network, or may be a wireless communications network. For example, the communications network may be a 5th generation (5G) system, a Long-Term Evolution (LTE) system, a Global System for Mobile Communications (GSM), a code-division multiple access (CDMA) network, a wideband CDMA (WCDMA) network, or the like. The communications network may further be another communications network or communications system, for example, Wi-Fi, or a wide area network.

Specifically, the computing device cluster collects and stores user information (raw data) of the one or more terminals. If there is a computing device cluster of a distributed structure that includes a plurality of computing devices, each of the plurality of computing devices may store user information of different terminals. For example, a computing device 1 may store user information of the terminal 1, and a computing device 2 may store user information of the terminal 2. The user information is for example, a user identifier, a user name, a user age, and user authorization information. As more terminals are connected, the computing device cluster needs to store more user information. However, as the user information increases, complexity of querying the user information is higher. The computing device may arrange the user information to form a data table, and then construct an index based on the data table. Subsequently, the user information may be queried in the data table based on the index.

Figure 1C:
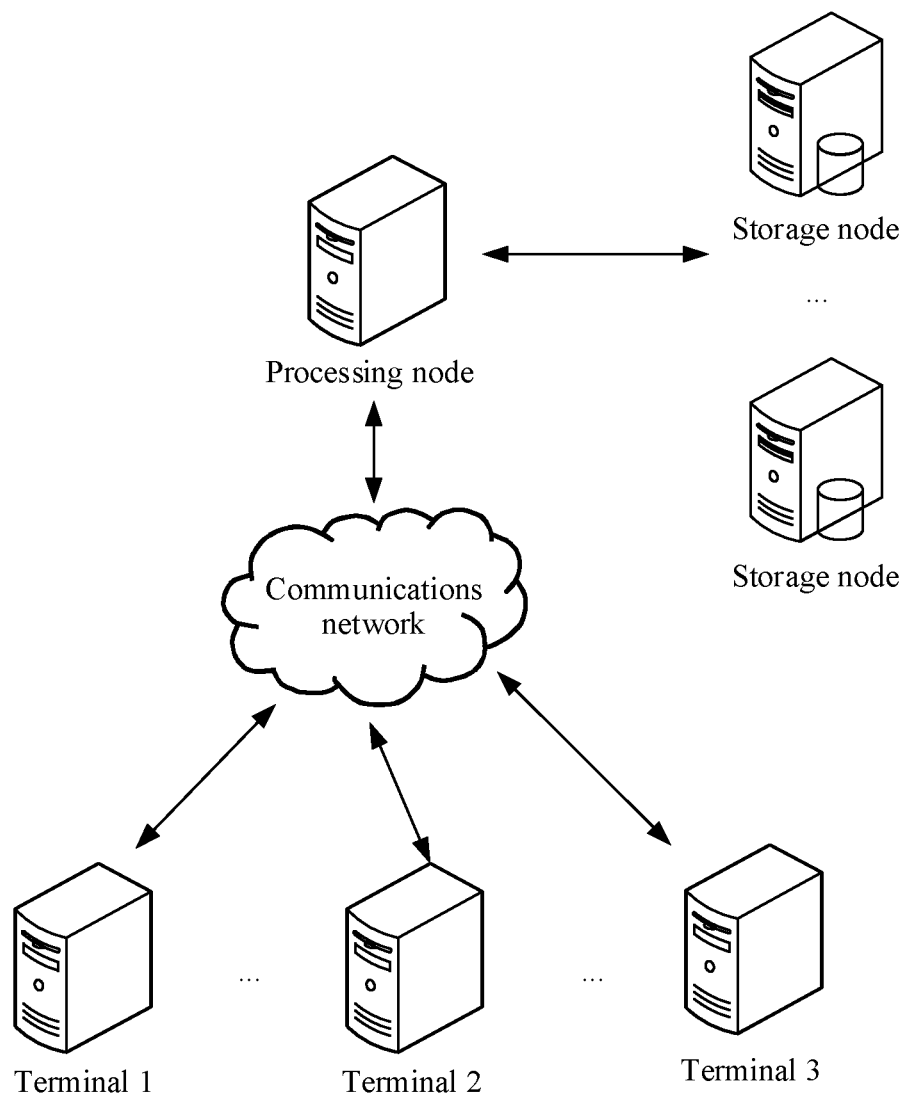
FIG. 1C is a schematic diagram of a structure of another data processing system.

For example, a system to which the data index establishment method and the index-based data query method are applicable may further be shown in FIG. 1C. The scenario may include one or more terminals, at least one processing node, and one or more storage nodes. The processing node and the storage node may be computing devices, or software nodes running on a computing device. When the processing node and the storage node are the software nodes, the processing node and the storage node may respectively be deployed on different computing devices, or may be deployed on a same computing device. After the terminal writes raw data into the storage node by using the processing node, the processing node establishes a mapping relationship for the raw data by using the method provided, and stores the mapping relationship. After the mapping relationship is stored, the terminal sends a query request to the processing node. The processing node determines, based on the stored mapping relationship, location information (a storage node identifier, or storage node address information) of target data in the query request, and obtains the target data from the storage node based on the location information by using the method provided. Computing device clusters in FIG. 1A, FIG. 1B, and FIG. 1C may provide a storage service, a big data service, a database service, and the like for the user of the terminal.

Therefore, this disclosure provides a data index establishment method and an index-based data query method. The index established by using the method can better reflect data distribution, reduce space required for storing the index, and improve subsequent data query efficiency.

Figure 2:
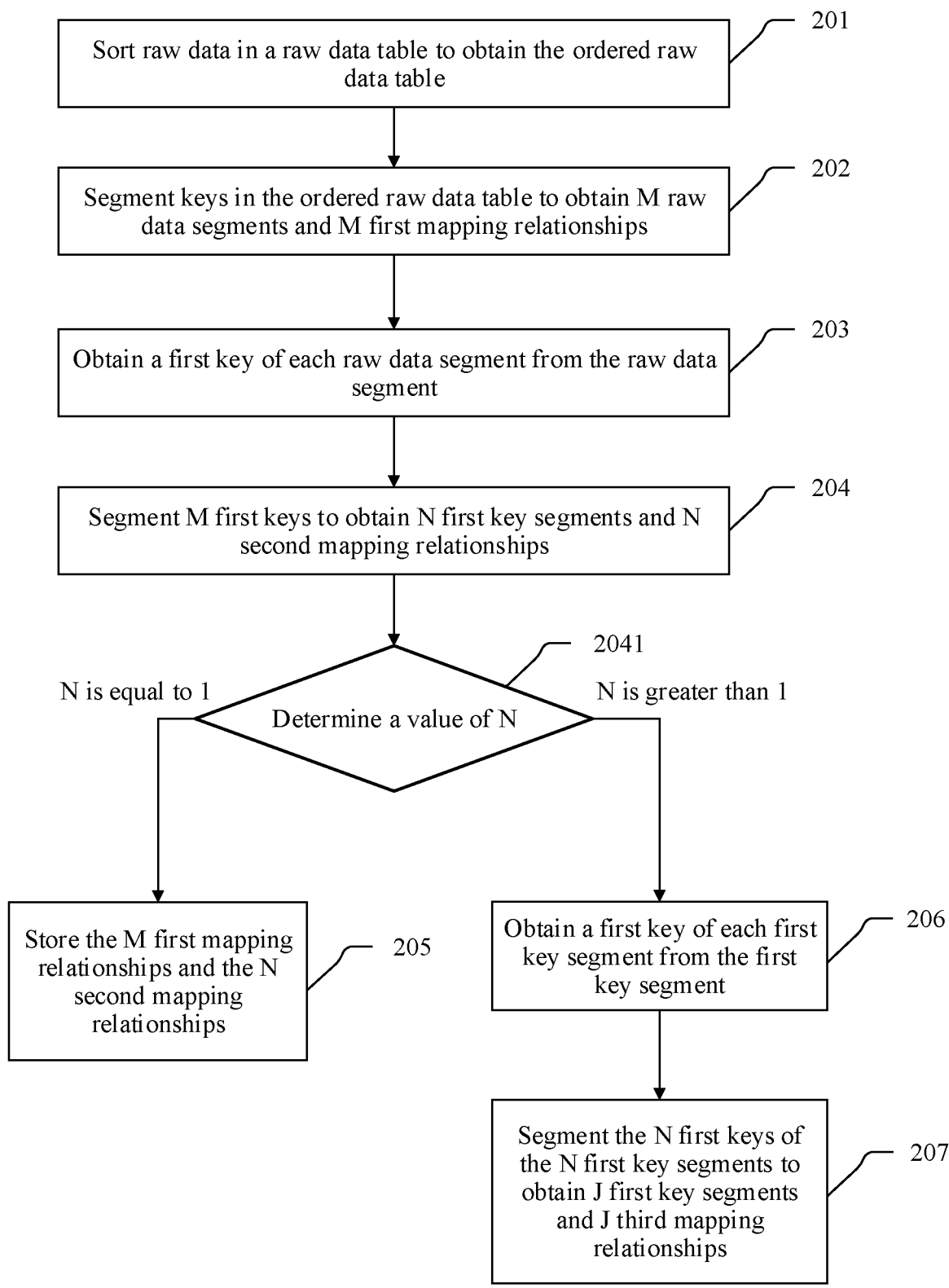
FIG. 2 is a schematic flowchart of a data index establishment method.

FIG. 2 is a schematic flowchart of a data index establishment method. Details are described as follows.

201: Sort raw data in a raw data table to obtain the ordered raw data table.

A plurality of pieces of raw data is obtained and stored in the raw data table. For example, the raw data may be the foregoing user information. Because a terminal generates the raw data in an unspecified sequence, the data in the raw data table is usually unordered.

Therefore, the raw data in the raw data table is arranged according to a preset rule to obtain the ordered raw data table. Each piece of raw data includes a plurality of attributes. The preset rule is sorting the raw data based on an attribute of the raw data. The attribute used for sorting is a key of the raw data, and a remaining attribute is a value of the data. A key of each piece of raw data is usually unique. In other words, different pieces of raw data have different keys.

Figure 3:
FIG. 3 is a schematic diagram of a structure of a raw data table.

For example, the obtained raw data table is shown in FIG. 3. The raw data table includes the plurality of pieces of raw data. Each piece of raw data may be represented in a form of (key, value). For example, the raw data (user information) includes the following attributes: a user identifier, a user name, a user age, user authorization information, and the like. In the raw data table, each user identifier is unique. The user identifier includes a number or can be converted into a number (for example, converting a character string into the number by using the American Standard Code for Information Interchange (ASCII) code). A user identifier of one piece of raw data is used as a key of the raw data. A remaining attribute of the raw data is used as a value of the raw data.

Then, the raw data in the raw data table in FIG. 3 is arranged based on the key of each piece of raw data, to obtain the ordered raw data table shown in FIG. 4. For example, the arrangement may be performed in ascending or descending order of values of keys of the raw data to obtain the ordered raw data table.

202: Segment keys in the ordered raw data table to obtain M raw data segments and M first mapping relationships, where each raw data segment includes at least one piece of raw data in the ordered raw data table.

After the ordered raw data table is obtained, the segmentation is performed based on the keys in the ordered raw data table. The raw data in the ordered raw data table is segmented into M segments, to obtain the M raw data segments and the M first mapping relationships corresponding to the M raw data segments, where M is an integer greater than 1. The M raw data segments are continuous. In other words, raw data with the largest key of an $m^{th}$ raw data segment is adjacent to raw data with the smallest key of an $(m+1)^{th}$ raw data segment in the ordered raw data table. Alternatively, raw data with the smallest key in an $m^{th}$ raw data segment is adjacent to raw data with the largest key in an $(m+1)^{th}$ raw data segment in the ordered raw data table (when the keys in the ordered raw data table are arranged in descending order), where m is an integer greater than or equal to 1 and less than M.

Each of the M first mapping relationships indicates a correspondence between a key of one raw data segment and a location of the key of the raw data segment in the ordered raw data table. The location of the key in the ordered raw data table indicates a row number of the key in the ordered raw data table, or a location offset between raw data in which the key is located and a first piece of raw data in the ordered raw data table. After the step 202, the M first mapping relationships are stored.

Each first mapping relationship includes one fitting model. Fitting models used for different first mapping relationships may be the same, or may be different. Each fitting model represents a relationship between an independent variable x and a dependent variable F(x). For example, a fitting model used for a first mapping relationship is $F_{1m}(x)$. The independent variable x is a key, and the dependent variable $F_{1m}$ indicates a location of the key in the ordered raw data table. The fitting model is a monotonically increasing function or a monotonically decreasing function (when the keys in the ordered raw data table are arranged in descending order). A common fitting model includes a linear function whose slope is greater than 0 or a linear function whose slope is less than 0 (when the keys in the ordered raw data table are arranged in descending order).

Figure 5:
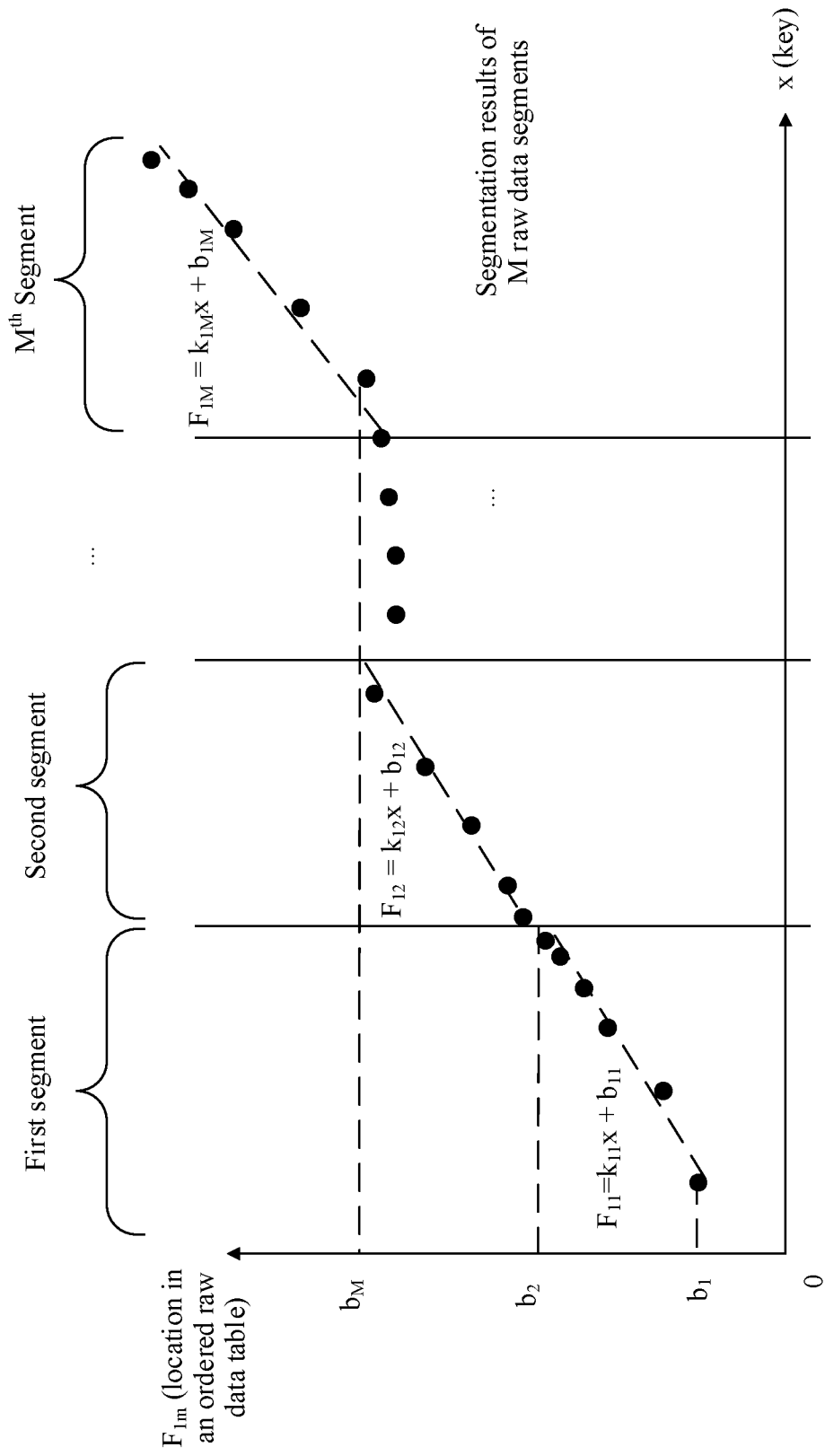
FIG. 5 is a schematic diagram of a segmentation result of raw data.

The following describes the step 202 by using an example with reference to FIG. 4, FIG. 5, and FIG. 6.

After the ordered raw data table is obtained, a location of each key in the ordered raw data table may be determined. As shown in FIG. 4, a location of a key 0001 in the ordered raw data table is 1, and a location of a key 0008 in the ordered raw data table is 5. If the location of the key in the ordered raw data table is a location offset, the location of the key 0001 in the ordered raw data table is 0, and the location of the key 0008 in the ordered raw data table is 4. Then, the segmentation is performed based on the key and the location of the key in the ordered raw data table to obtain the M raw data segments. The segmentation performed on the keys in the raw data table, segmentation performed on first keys of a raw data segment described below, or segmentation performed on first keys of a first key segment described below respectively includes a process of fitting the keys, a process of fitting the first keys, or a process of fitting the first keys of the first key segment. The fitting processes are using fitting models to represent a correspondence between a key and a location in the raw data table, a correspondence between a first key and an identifier of a mapping relationship, and a correspondence between a first key of the first key segment and an identifier of a mapping relationship. During the fitting process, as many (not exceeding a threshold quantity) keys as possible are segmented into a same segment on while ensuring accuracy of the fitting model as much as possible.

For example, when the segmentation is performed based on the key and the location of the key in the ordered raw data table, a coordinate system is first established based on the key and the location of the key in the ordered raw data table. In other words, the key in the ordered raw data table and the location of the key in the ordered raw data table in FIG. 4 are mapped to a coordinate system shown in FIG. 5. Then, the keys are fitted in sequence. For example, a key in an $n_1^{th}$ row in the ordered raw data table ($n_1$ is an integer greater than 1) is scanned in ascending order of an x-axis during the fitting. If first ($n_1-1$) keys meet a fitting condition, the first ($n_1-1$) keys may be segmented into a segment, which is referred to as a first segment below. The fitting is performed on an $n_1^{th}$ key in the first segment. If the fitting condition is met, the $n_1^{th}$ key is segmented into the first segment. If the fitting condition is not met, the $n_1^{th}$ key is segmented into a next segment (a second segment), and is used as a first key in the second segment. As shown in FIG. 6, a mapping relationship corresponding to a first raw data segment is $F_{11}=k_{11}x+b_{11}$. A mapping relationship corresponding to a second raw data segment is $F_{12}=k_{12}x+b_{12}$. A mapping relationship corresponding to an $M^{th}$ raw data segment is $F_{1M}=k_{1M}x+b_{1M}$. Each point in FIG. 5 indicates one key. An x axis indicates a value of the key, and e axis indicates a location of the key in the ordered raw data table. $k_{11}$, $k_{12}$, $k_{1M}$, $b_{11}$, $b_{12}$, $b_{1M}$, and the like are parameters obtained based on the fitting.

Each of the M first mapping relationships indicates the correspondence between the key of the raw data segment and the location of the key of the raw data segment in the ordered raw data table. The location of the key of the raw data segment in the ordered raw data table may not necessarily be an actual location of the key of the raw data segment in the ordered raw data table. In a segmentation process, it may not be ensured that a mapping relationship corresponding to each raw data segment is accurate. In other words, it may not be ensured that in a data query process, after a key is input into a fitting model corresponding to a raw data segment in which the key is located, an output location is an actual location of the key in the ordered raw data table. There may be an error between the output location and the actual location. In this case, query needs to performed in a specific range in the ordered raw data table based on the output location, to locate the actual location of the key. For example, the fitting condition may be specifically that an error range between a fitting result and an actual result does not exceed a first threshold, or a quantity of pieces of raw data fitted into each segment does not exceed a second threshold. The first threshold, and the second threshold are preset parameters. The error range may be a difference between a location of a key in the ordered raw data table and an actual location of the key in the ordered raw data table, where the location of the key is output after the key used as the independent variable is input in the fitting result (the first mapping relationship).

For example, the ordered raw data table includes 8500 pieces of data. The fitting is performed based on a key of each piece of raw data, and the segmentation is performed based on the fitting result to obtain 10 raw data segments and 10 first mapping relationships. A quantity of pieces of raw data included in each of the 10 raw data segments may be the same, or may be different.

Figure 7:
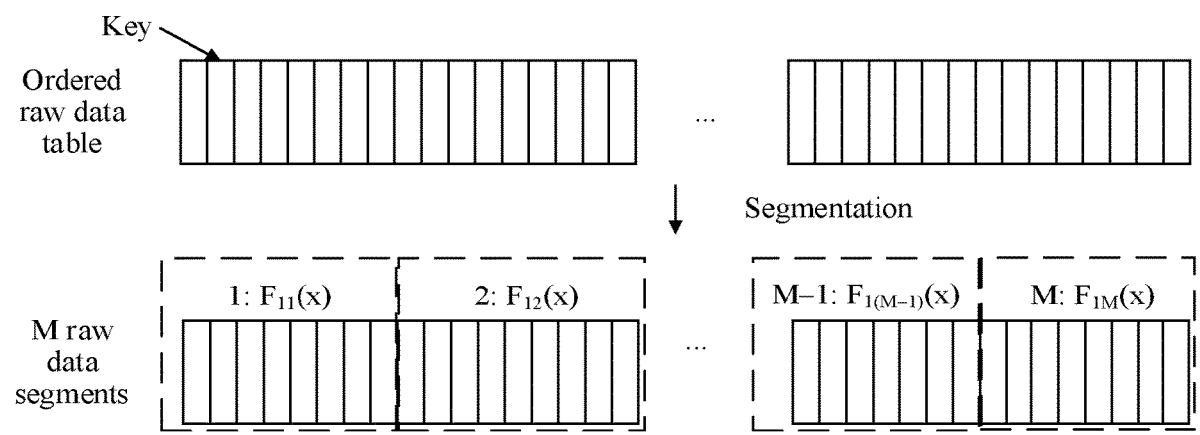
FIG. 7 is another schematic diagram of a segmentation result of raw data.

Another representation manner is shown in FIG. 7. FIG. 7 shows only the keys in the ordered raw data table, and values corresponding to the keys are not shown in FIG. 7. After the keys in the ordered raw data table are segmented, the M raw data segments can be obtained. A mapping relationship of each raw data segment indicates a correspondence between the key included in the raw data segment and the location of the key in the ordered raw data table. For example, a mapping relationship of a first raw data segment is represented as $F_{11}(x)$. A mapping relationship of a second raw data segment is represented as $F_{12}(x)$. A mapping relationship of an $(M-1)^{th}$ raw data segment is represented as $F_{1(M-1)}(x)$. A mapping relationship of an $M^{th}$ raw data segment is represented as $F_{1M}(x)$. $F_{11}(x)$ represents a correspondence between a key of raw data in the first raw data segment and a location of the key of the raw data in the first raw data segment in the ordered raw data table. A mapping relationship of a remaining raw data segment is deduced by analogy.

In another specific scenario, for example, when the raw data table includes a comparatively small quantity of pieces of raw data, the raw data in the ordered raw data table can be segmented into only one segment. In other words, M is equal to 1. In this case, subsequent steps may not be performed.

203: Obtain a first key of each raw data segment from the raw data segment.

Figure 8:
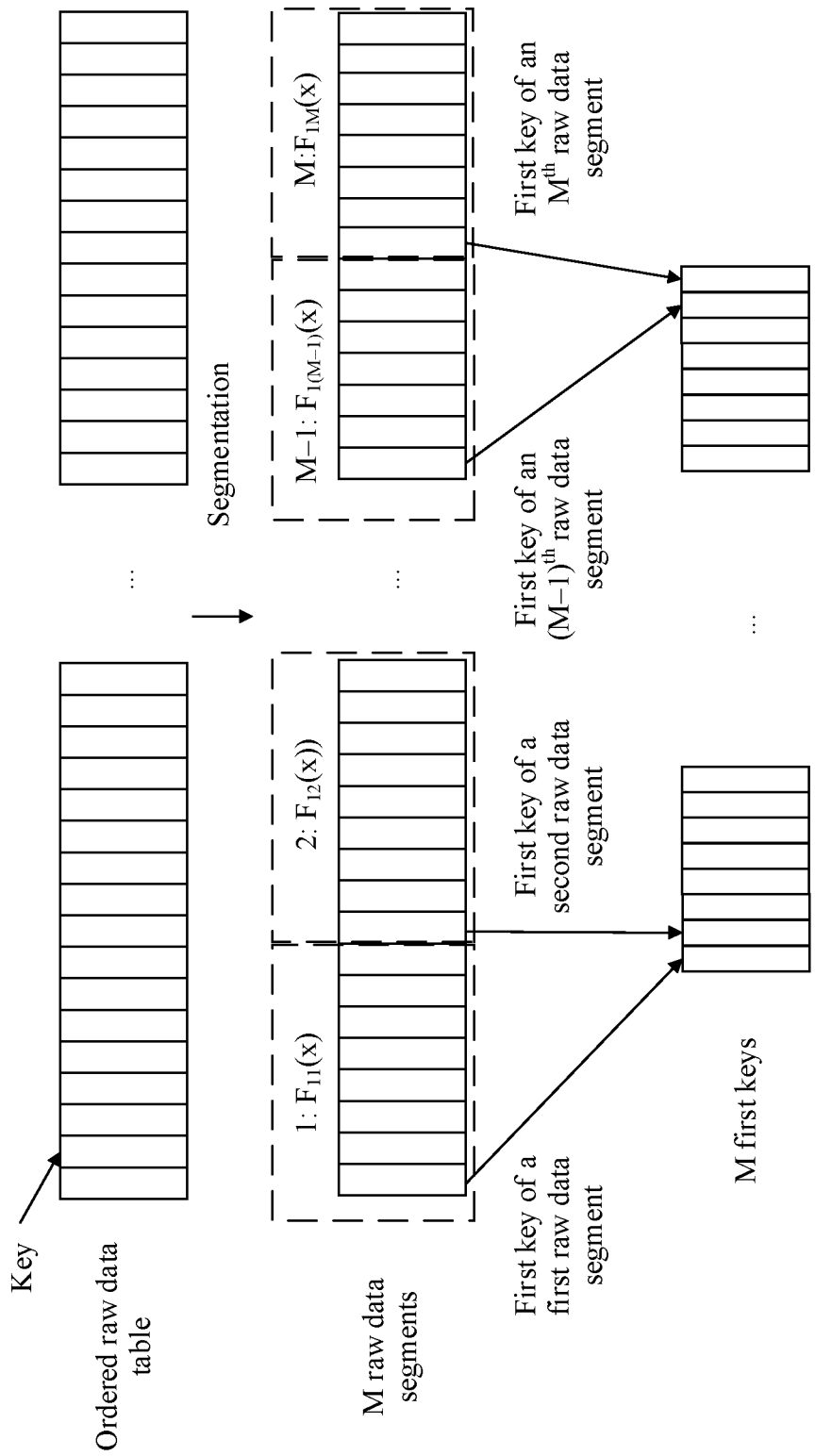
FIG. 8 is a schematic diagram of extracting a first key from a raw data segment.

As shown in FIG. 8, after the M raw data segments are obtained, a key of first raw data of each raw data segment is extracted, to obtain first keys of the M raw data segments. There are a total of M first keys. According to a sorting rule of the ordered raw data table, a first key of a raw data segment is a key with the smallest row number (location offset) in the raw data segment. The first key of the raw data segment may be specifically the smallest key of the raw data segment, or the largest key of the raw data segment (when the keys in the ordered raw data table are arranged in descending order). For example, based on the segmentation result provided in FIG. 6, the extracted M first keys include 0001, 0017, 0158, 0165, and the like.

204: Segment M first keys to obtain N first key segments and N second mapping relationships, where each first key segment includes at least one first key in the M ordered first keys.

After the M first keys are obtained, the segmentation is performed based on the M first keys to obtain the N first key segments and the N second mapping relationships corresponding to the N raw data segments, where N is an integer greater than or equal to 1.

Each of the N second mapping relationships indicates a correspondence between a first key of one first key segment and an identifier of a first mapping relationship of a source data segment of the first key of the first key segment. The first key of the one first key segment is any key of the first key segment. Any key of the first key segment is the first key obtained from the raw data segment. The identifier of the first mapping relationship of the source data segment of the first key of the first key segment points to the first mapping relationship of the source data segment of the first key. For example, the identifier of the first mapping relationship of the source data segment of the first key of the first key segment is a storage address. The storage address stores the first mapping relationship of the source data segment of the first key. Alternatively, the identifier of the first mapping relationship of the source data segment of the first key of the first key segment is a pointer. The pointer points to an address of the first mapping relationship of the source data segment that stores the first key. A source data segment of a first key is the raw data segment of the first key, extracted in the step 203. The first mapping relationship of the source data segment of the first key is a first mapping relationship that is obtained in the step 202 and that is of the raw data segment of the first key, extracted in the step 203. After the step 204, the N second mapping relationships are stored.

An implementation principle of the step 204 is similar to that of the step 202. For a process of segmenting the M first keys, refer to a process of segmenting the ordered raw data table in the step 202. A difference lies in that a segment object in the step 202 is the ordered raw data table, and a segment object in the step 204 is the M first keys. Fitting results in the step 202 and the step 204 may be the same, or may be different. For example, N and M may be the same or different. Fitting models included in the M first mapping relationships obtained in the step 202 and fitting models included in the N second mapping relationships obtained in the step 204 may be the same or different.

Each second mapping relationship includes one fitting model. Fitting models used for different second mapping relationships may be the same, or may be different. For example, a fitting model used for a second mapping relationship is $F_{2n}(x)$, where an independent variable x is a key, a dependent variable $F_{2n}$ points to one first mapping relationship, and a first key of a raw data segment corresponding to the first mapping relationship is a current independent variable key, $1 \le n \le N$. A segmentation result shown in FIG. 6 is used as an example. If the independent variable key is 0017, 0017 is input into the second mapping relationship, and an output dependent variable indicates $F_{12}(x)$. The fitting model is a monotonically increasing function or a monotonically decreasing function (when the keys in the ordered raw data table are arranged in descending order). A common fitting model includes a linear function whose slope is greater than 0 or a linear function whose slope is less than 0 (when the keys in the ordered raw data table are arranged in descending order).

Figure 9:
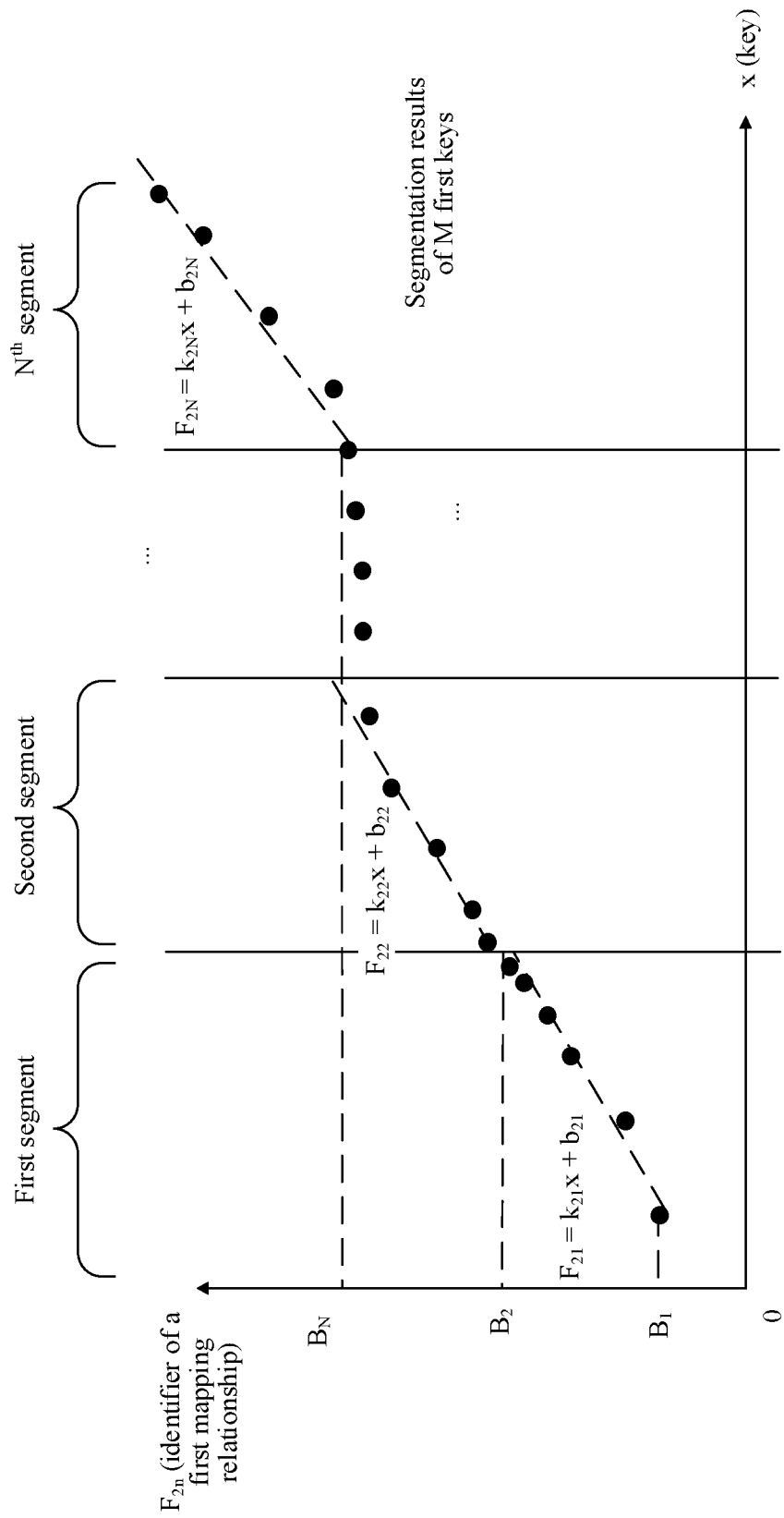
FIG. 9 is a schematic diagram of a segmentation result of a first key of a raw data segment.
Figure 10:
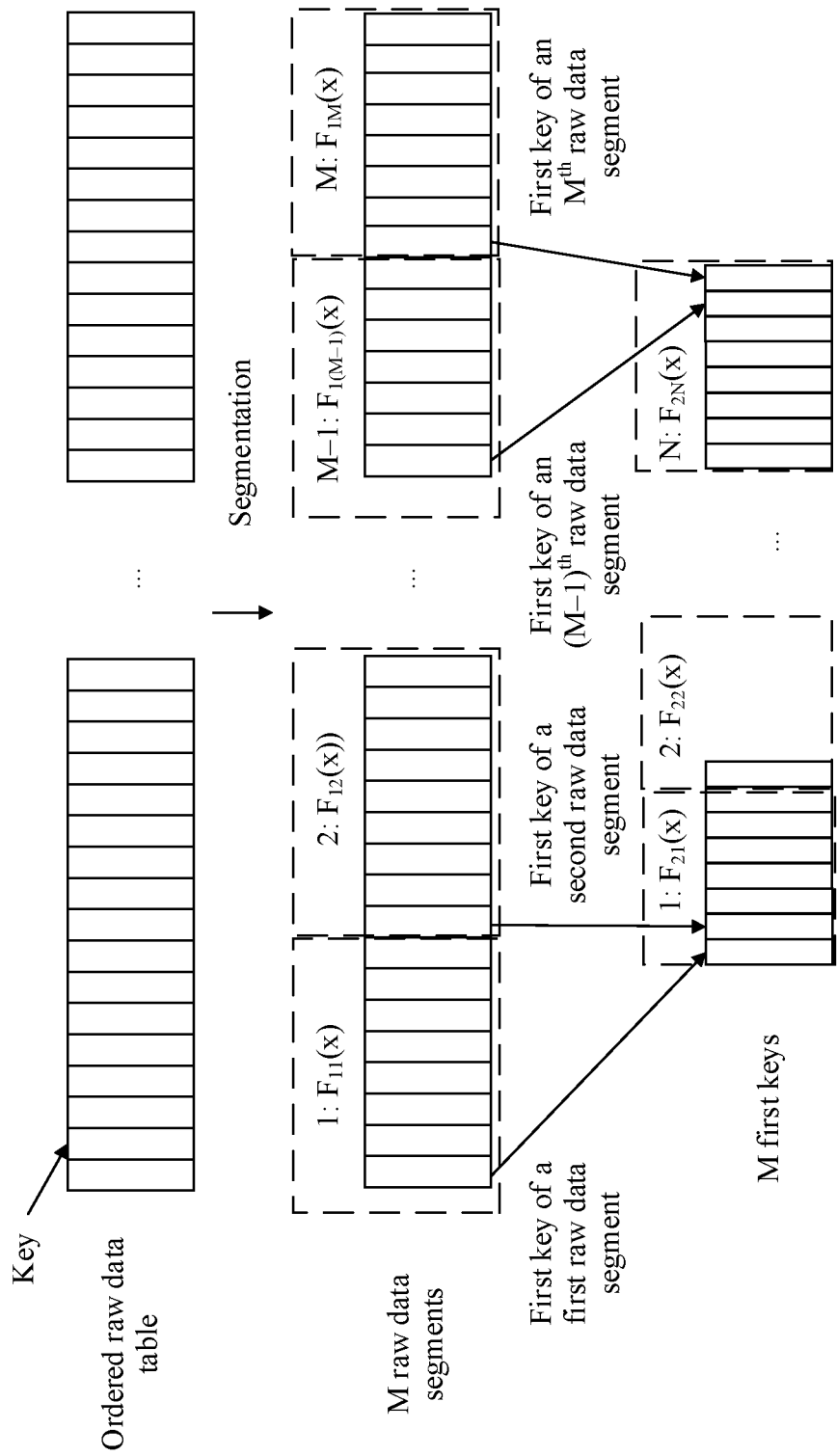
FIG. 10 is another schematic diagram of a segmentation result of a first key of a raw data segment.

The following describes the step 204 by using an example with reference to FIG. 9, and FIG. 10.

When the segmentation is performed based on the correspondence between the first key and the identifier of the first mapping relationship of the source data segment of the first key, a coordinate system is first established based on the correspondence between the first key and the identifier of the first mapping relationship of the source data segment of the first key. In other words, a correspondence in FIG. 8 between the first key and the identifier of the first mapping relationship of the source data segment of the first key is mapped to a coordinate system shown in FIG. 9. Then, the first key is fitted in sequence. For example, an $n_2^{th}$ ($n_2$ is an integer greater than 1 and less than or equal to M) first key is scanned in ascending order of an x-axis during scanning. If first ($n_2$−1) first keys meet a fitting condition, the first ($n_2$−1) keys may be segmented into a segment, which is referred to as a third segment below. Fitting is performed on the $n_2^{th}$ first key in the third segment. If the fitting condition is met, the $n_2^{th}$ first key is segmented into the third segment. If the fitting condition is not met, the $n_2^{th}$ key is segmented into a next segment (a fourth segment), and is used as a first key in the fourth segment. As shown in FIG. 9, a mapping relationship corresponding to a first key segment is $F_{21}=k_{21}x+b_{21}$. A mapping relationship corresponding to a second first key segment is $F_{22}=k_{22}x+b_{22}$. A mapping relationship corresponding to an $M^{th}$ first key segment is $F_{2N}=k_{2N}x+b_{2N}$. Each point in FIG. 9 indicates one first key, an x axis indicates a value of the first key, and a $y$ axis indicates an identifier of a first mapping relationship of a source data segment of the first key. $k_{21}$, $k_{22}$, $k_{2N}$, $b_{21}$, $b_{22}$, $b_{2N}$, and the like are parameters obtained based on the fitting.

Another representation manner is shown in FIG. 10. After the M first keys are segmented, the N first key segments may be obtained. A mapping relationship of each first key segment indicates a correspondence between a first key included in the first key segment and an identifier of a first mapping relationship of a source data segment of the first key of the first key segment. For example, a mapping relationship of the first key segment is represented as $F_{21}(x)$. A mapping relationship of the second first key segment is represented as $F_{22}(x)$. A mapping relationship of an $(N-1)^{th}$ first key segment is represented as $F_{1(N-1)}(x)$. A mapping relationship of the $N^{th}$ first key segment is represented as $F_{1N}(x)$. $F_{21}(x)$ represents a correspondence between a first key in the first first key segment and an identifier of a first mapping relationship of a source data segment of the first key of the first key segment. A mapping relationship of a remaining first key segment is obtained by analogy.

Step 2041: Determine that a value of N is equal to 1 or greater than 1, and perform two subsequent sub-steps based on different values of N. If N is equal to 1, step 205 is performed. If N is greater than 1, step 206 and subsequent steps are performed.

Step 205: Store the M first mapping relationships and the N second mapping relationships for subsequent data query.

The M first mapping relationships and the N second mapping relationships are stored as indexes of the raw data table. The index of the raw data table includes a mapping relationship between the key of the raw data in the raw data table and the location of the raw data. The index of the raw data table is used to improve efficiency of locating the raw data based on the mapping relationship in a data query process.

Step 206: Obtain a first key of each first key segment from the first key segment.

Figure 11:
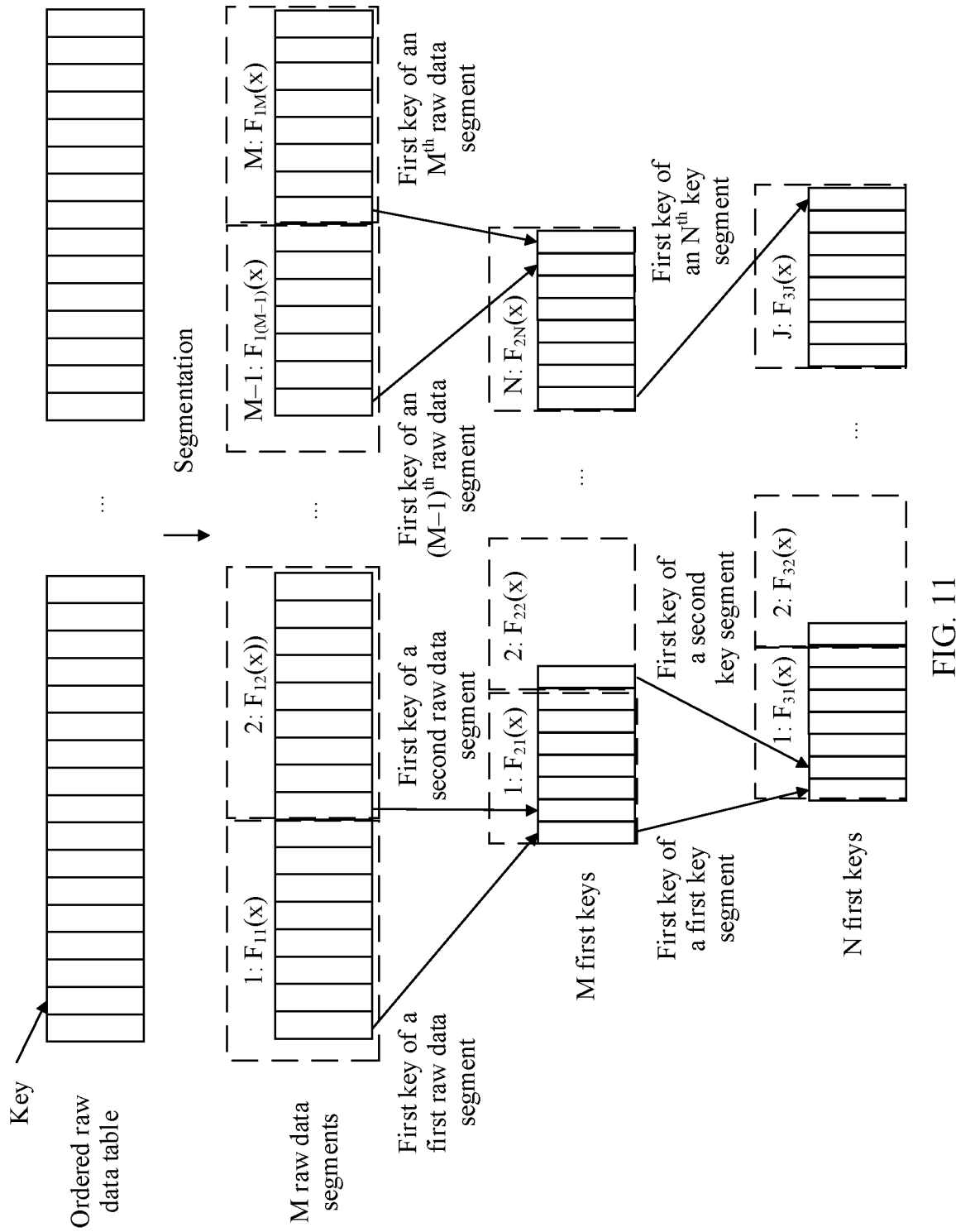
FIG. 11 is a schematic diagram of a segmentation result of a first key of a first key segment.

The step 206 is similar to the step 203. To be specific, each raw data segment in the step 203 is replaced with each first key segment. Therefore, in the step 206, the first key of each first key segment is obtained from each first key segment in the N first key segments. There are a total of N first keys. The first key of the first key segment from steps 206 and 207 is the key with the smallest row number (location offset) in the first key segment. The first key of the first key segment may be specifically the smallest key of the first key segment, or the largest key of the first keys segment (when the keys in the ordered raw data table are arranged in descending order). Therefore, the N first keys of the N first key segments may be obtained from the N first key segments. Details are shown in FIG. 11.

Step 207: Segment the N first keys obtained from the N first key segments to obtain J first key segments and J third mapping relationships, where each of the J first key segments includes at least one of the N first keys of the N first key segments.

Each of the J third mapping relationships indicates a correspondence between a first key of one first key segment and an identifier of a second mapping relationship of a source first key segment of the first key of the first key segment. The identifier of the second mapping relationship of the source first key segment of the first key of the first key segment points to the second mapping relationship of the source first key segment of the first key. For example, the identifier of the second mapping relationship of the source first key segment of the first key of the first key segment is a storage address. The storage address stores the second mapping relationship of the source first key segment of the first key of the first key segment. Alternatively, the identifier of the second mapping relationship of the source first key segment of the first key of the first key segment is a pointer. The pointer points to an address of the second mapping relationship of the source first key segment of the first key of the first key segment. A second mapping relationship of a source first key segment of one of the N first keys is the second mapping relationship that is obtained in the step 204 and that is of the first key segment of the first key, extracted in the step 206.

The step 207 is similar to the step 204. To be specific, the M first keys in the step 204 are replaced with the N first keys obtained from the N first key segments. As shown in FIG. 11, the N first keys obtained from the N first key segments are fitted into J segments. A mapping relationship corresponding to a first segment in the J segments is $F_{31}$. A mapping relationship corresponding to a second segment in the J segments is $F_{32}$. A mapping relationship corresponding to a $J^{th}$ segment in the J segment is $F_{3,J}$.

After three times of segmentation (the step 202, the step 204, and the step 207), in a segmentation result in the step 207, the N first keys obtained from the N first key segments are only fitted into one segment. In other words, J=1. If J is greater than 1, the step 206 and the step 207 continue to be repeatedly performed on the segmentation result in the step 207. A first key is extracted from each first key segment in the segmentation result in the step 207. There are a total of J first keys. The J first keys are segmented to obtain H first key segments and H fourth mapping relationships. A mapping relationship corresponding to a first segment in the H segments is $F_{41}$. A mapping relationship corresponding to a second segment in the H segments is $F_{42}$. A mapping relationship corresponding to an $H^{th}$ segment in the H segments is $F_{4,J}$. If H is still greater than 1, the step 206 and the step 207 are repeatedly performed on a result of four times of segmentation until one-layer first key is fitted into one segment.

It should be noted that the step 206, the step 207 and a subsequent step thereof are optional steps. An objective of the step 206, the step 207, and the subsequent step thereof is establishing a correspondence between a key of any piece of to-be-queried data and a second mapping relationship. In other words, the objective of the step 206, the step 207, and the subsequent step thereof is determining which one of the N second mapping relationships needs to be input when the key of any piece of the to-be-queried data is used as the independent variable. Therefore, the correspondence between the key of any piece of to-be-queried data and the second mapping relationship may also be established in another manner, for example, establishing a hash mapping table.

In the foregoing manner, the index (each mapping relationship) is established for the raw data table, and a distribution feature of the raw data is fully considered in the segmentation process. The index established in the foregoing manner has low complexity and occupies small space, and data query efficiency based on the index is higher.

Figure 12:
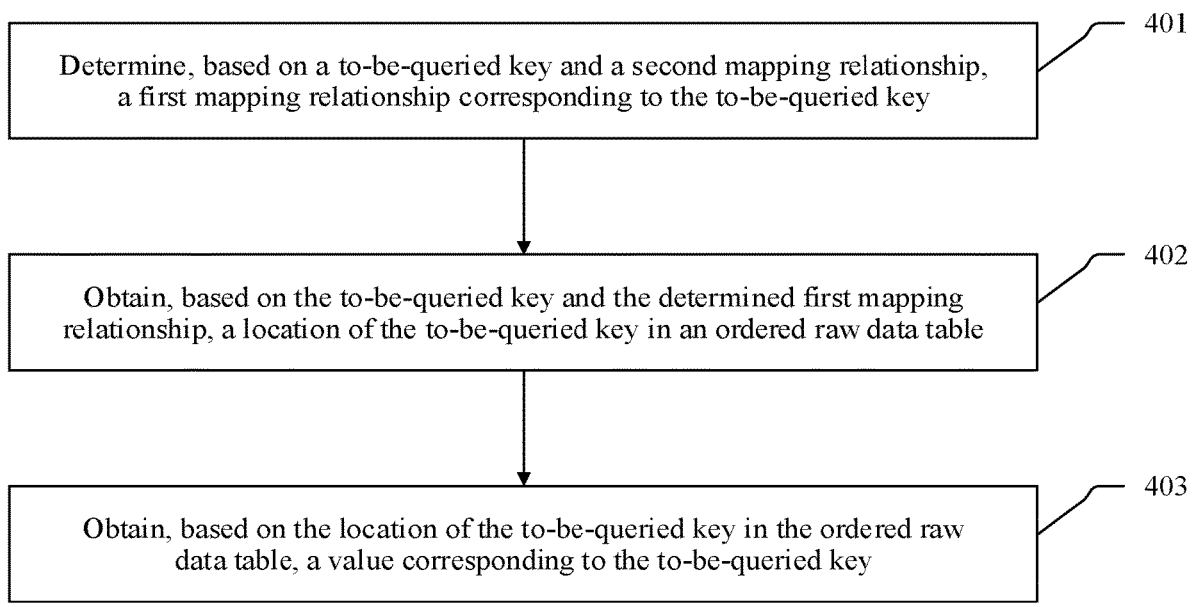
FIG. 12 is a schematic flowchart of a data query method.

The following describes a process of implementing data query by using the index established by using the method provided in FIG. 2. As shown in FIG. 12, a data query method when the index includes a two-layer mapping relationship is first described. To be specific, N is equal to 1.

Step 401: Determine, based on a to-be-queried key and a second mapping relationship, a first mapping relationship corresponding to the to-be-queried key.

Figure 13:
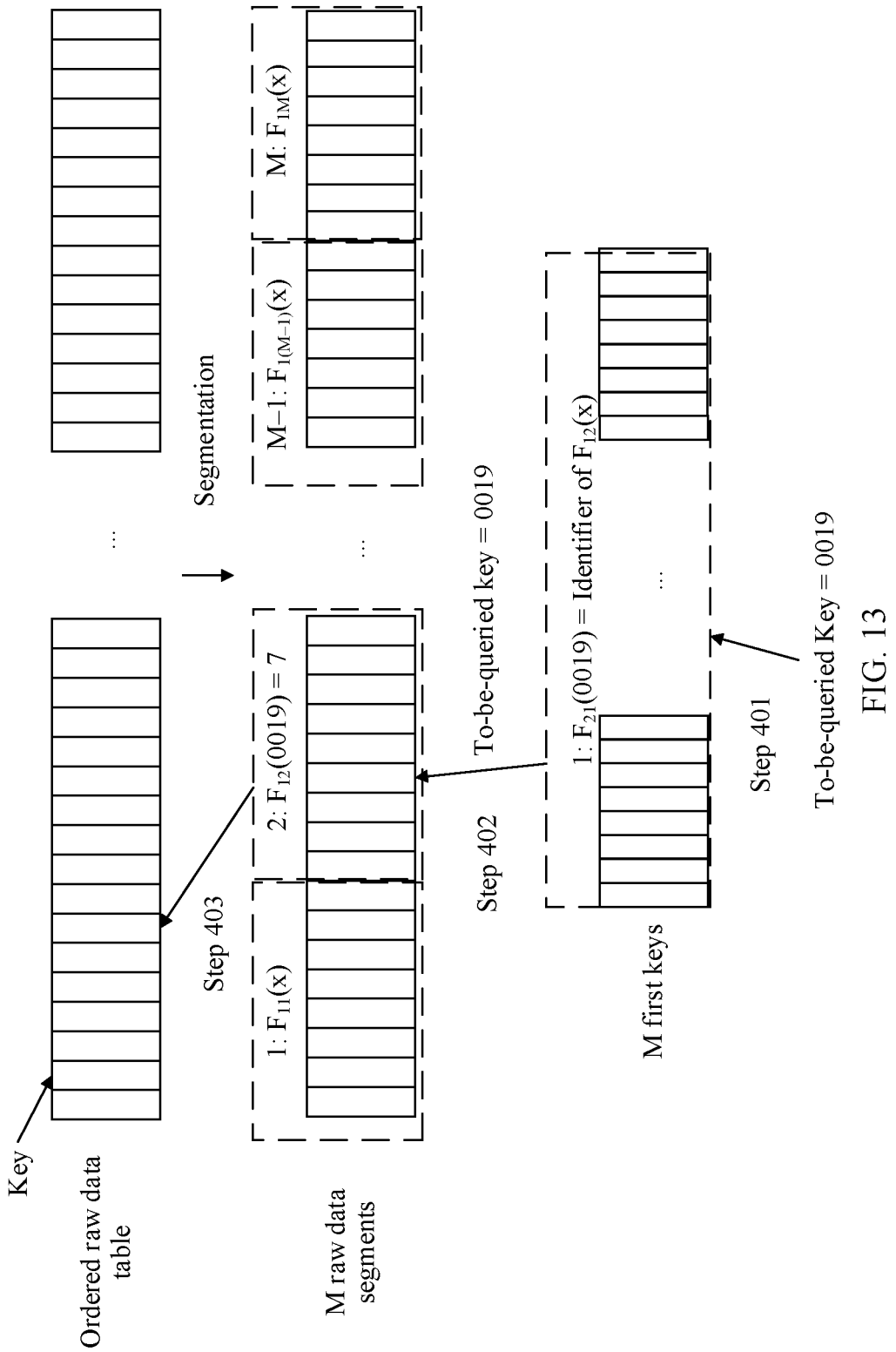
FIG. 13 is a schematic diagram of a data query method.

For example, the to-be-queried key is a user identifier. A user sends, by using a terminal, the to-be-queried key to a system to query a value corresponding to the user identifier. After receiving the to-be-queried key, the system inputs the to-be-queried key as an independent variable into the second mapping relationship. Each second mapping relationship indicates the correspondence between the first key of the first key segment and the identifier of the first mapping relationship of the source data segment of the first key of the first key segment. Therefore, the first mapping relationship corresponding to the to-be-queried key, namely, a first mapping relationship corresponding to the raw data segment in which the to-be-queried key is located, may be determined based on the to-be-queried key and the second mapping relationship. The segmentation result provided in FIG. 6 is used as an example. When the to-be-queried key is 0019, 0019 is input into the second mapping relationship $F_{21}(x)$, and an identifier of $F_{12}(x)$, namely, the first mapping relationship corresponding to 0019 is output from the second mapping relationship $F_{21}(0019)$, as shown in FIG. 13.

It should be noted that, because a first key of each raw data segment is used during fitting of the second mapping relationship, and the to-be-queried key may not necessarily be a first key of one raw data segment, an output result obtained after the to-be-queried key is input into the second mapping relationship may not be directly used as the identifier of the first mapping relationship corresponding to the to-be-queried key. After an output result of the second mapping relationship is obtained, specific processing needs to be performed to obtain the identifier of the first mapping relationship corresponding to the to-be-queried key, for example, rounding down. For example, as shown in FIG. 6, a key 0001 to a key 0008 are segmented into a same raw data segment. A key 0017 to a key 0157 are segmented into a same raw data segment. The key 0001 is used as a first key of a first raw data segment. The key 0017 is used as a first key of a second raw data segment. Both the key 0001 and the key 0017 are segmented into a first first key segment (a second mapping relationship corresponding to the first first key segment is $F_{21}$). An identifier of a first mapping relationship $F_{11}$ is 11, and an identifier of a first mapping relationship $F_{12}$ is 12. In this case, output of both $F_{21}$ (0017) to $F_{21}$ (0157) is numbers greater than 12, and the output may be numbers less than 13. Therefore, 12, the identifier of the first mapping relationship $F_{12}$, is obtained by rounding down the output of $F_{21}$ (0017) to $F_{21}$ (0157). By analogy, output of both $F_{21}$ (0001) to $F_{21}$ (0008) is numbers greater than 11, and the output may be numbers less than 12. Therefore, 11, the identifier of the first mapping relationship $F_{11}$, is obtained by rounding down the output of $F_{21}$ (0001) to $F_{21}$ (0008).

Step 402: Obtain, based on the to-be-queried key and the determined first mapping relationship, a location of the to-be-queried key in the ordered raw data table.

Each first mapping relationship indicates the correspondence between the key of the raw data segment and the location of the key of the raw data segment in the raw data table. Therefore, after the to-be-queried key is input into the first mapping relationship determined in the step 401, the location of the to-be-queried key in the ordered raw data table is output based on the determined first mapping relationship. As shown in FIG. 13, the to-be-queried key 0019 is continuously input into $F_{12}(x)$, and output of $F_{12}$ (0019) is the location information of 0019 in the ordered raw data table, namely, 7 (a row number) or 6 (a location offset) (not shown in the figure).

It should be noted that, because an output result obtained after the to-be-queried key is input into the determined first mapping relationship may not be directly used as the location information, after the output result is obtained, specific processing needs to be performed to obtain location information of the to-be-queried key, for example, rounding down.

Step 403: Obtain, based on the location of the to-be-queried key in the ordered raw data table, a value corresponding to the to-be-queried key.

Still as shown in FIG. 13, after the location of the to-be-queried key in the ordered raw data table is obtained, the system obtains, from the location in the ordered raw data table, the value corresponding to the to-be-queried key, and returns the obtained value to a user terminal.

According to the index-based data query method provided above, the location of the to-be-queried key in the data table is located based on the index obtained through segment fitting. Compared with other approaches, the method greatly reduces query time consumption and improves query efficiency.

Figure 14:
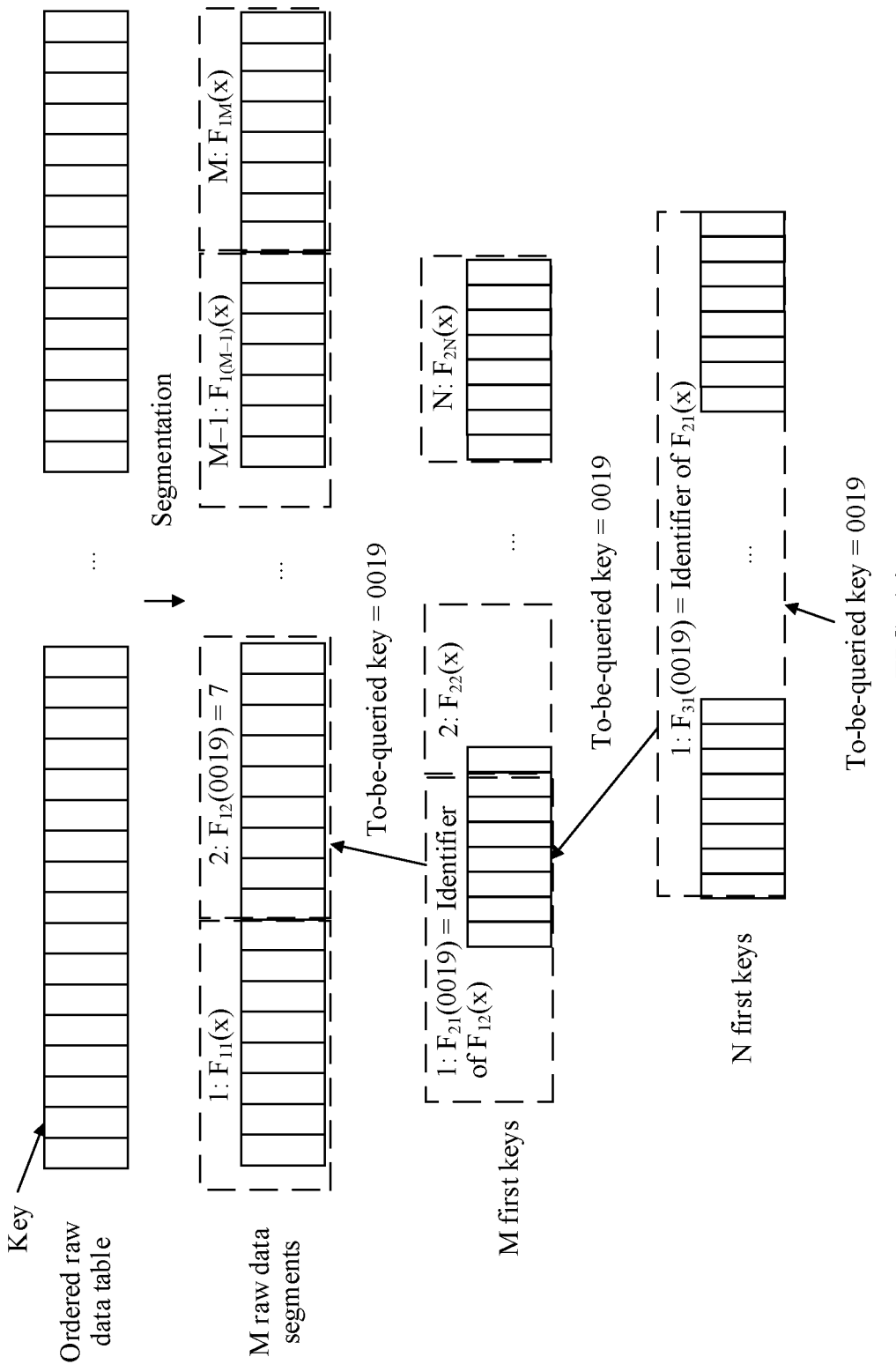
FIG. 14 is a schematic diagram of another data query method.

Further, as shown in FIG. 14, a data query method when the index includes three-layer mapping relationship, namely, when J is equal to 1 is described.

Compared with the method provided in FIG. 12 and FIG. 13, when the index includes the three-layer mapping relationship, the to-be-queried key is first input into the third mapping relationship, to determine a second mapping relationship corresponding to the to-be-queried key. Subsequent steps are the same as the step 401 to the step 403. As shown in FIG. 14, the segmentation result shown in FIG. 6 is used as an example. When the to-be-queried key is 0019, 0019 is input into the third mapping relationship $F_{31}(x)$, and an identifier of $F_{21}(x)$ is output from the third mapping relationship $F_{31}(0019)$. The to-be-queried key 0019 is continuously input into $F_{21}(x)$. Output of $F_{21}(0019)$ is an identifier of $F_{12}(x)$. Finally, the to-be-queried key 0019 is input into $F_{12}(x)$. Output of $F_{12}(0019)$ is location information of 0019 in the ordered raw data table, namely, 7 (a row number) or 6 (a location offset) (not shown in the figure).

Further, if the index includes more layers of mapping relationships, the to-be-queried key is first input into a mapping relationship at the highest layer, output of the mapping relationship at the highest layer is an identifier of a mapping relationship at a second highest layer. Then, the to-be-queried key is input into the mapping relationship at the second highest layer to obtain an identifier of a mapping relationship at a third highest layer, and so on. After the second mapping relationship is obtained, the value corresponding to the to-be-queried key may be obtained from the raw data table by performing the step 401 to the step 403.

In the index-based data query method provided above, only a comparatively small quantity of operations are performed to determine the location information of the to-be-queried key. The quantity is determined based on a quantity of layers of a mapping relationship included in the index. This improves data query efficiency.

Figure 15:
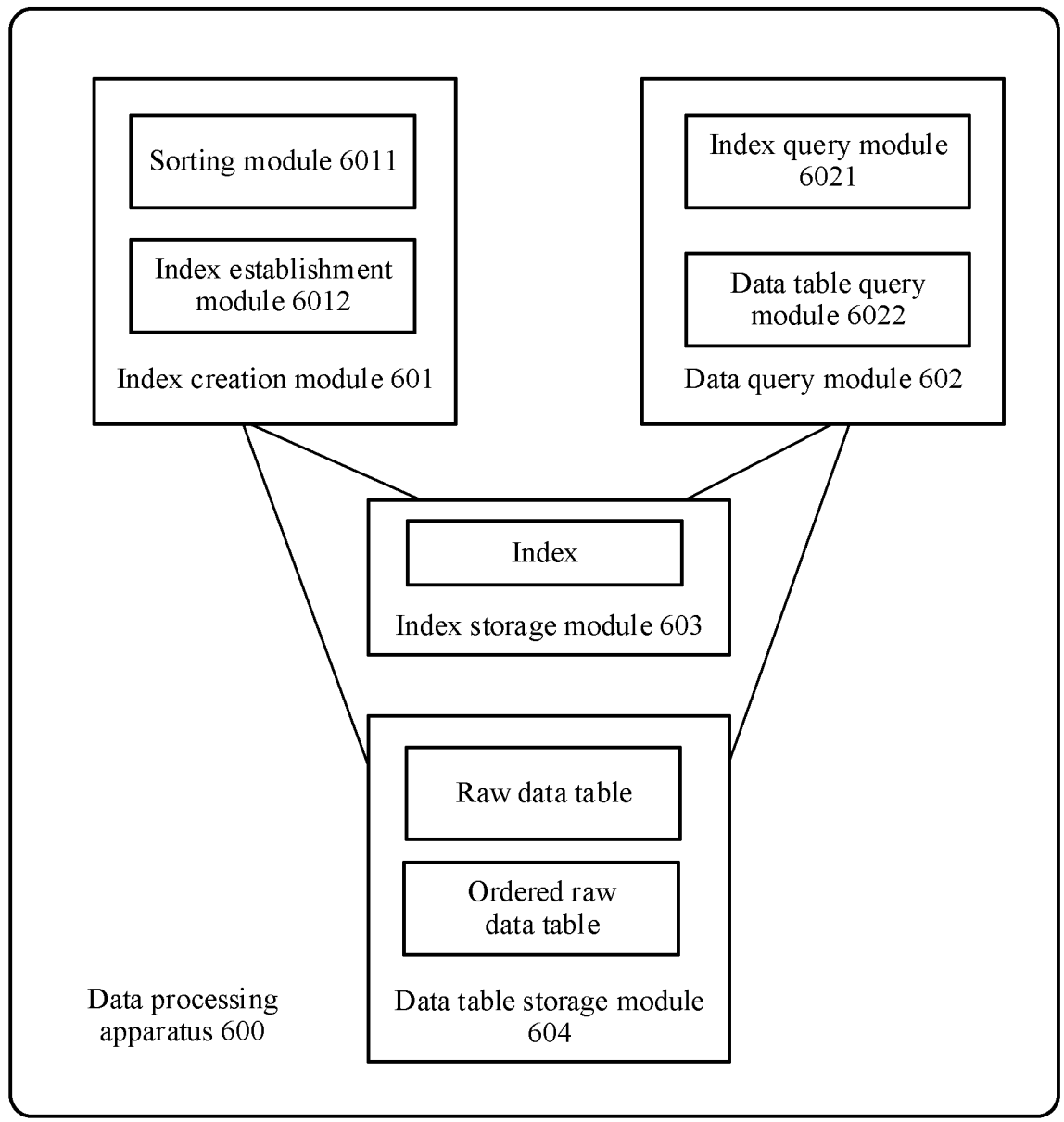
FIG. 15 is a schematic diagram of a structure of a data processing apparatus.

The following describes a data processing apparatus 600. As shown in FIG. 15, the apparatus includes four parts: an index creation module 601, an index storage module 603, a data query module 602, and a data table storage module 604.

The index creation module 601 is configured to perform the step 201 to the step 207. A sorting module 6011 obtains a stored raw data table from the data table storage module 604, and stores the sorted raw data table into the data table storage module 604 after the step 201 is performed. An index establishment module 6012 performs the step 202 to the step 207 to establish an index for the ordered raw data table, and stores the established index into the index storage module 603.

The data query module 602 is configured to perform the step 401 to the step 403 and the data query method when the index includes the three or more layers of mapping relationships. An index query module 6021 performs the step 401 and the step 402, and gains access to the index stored in the storage index module 603 to determine a location of a to-be-queried key in the ordered raw data table. A data table query module 6022 performs the step 403 of gaining access to, based on the location of the to-be-queried key in the ordered raw data table, the ordered raw data table stored in the data table storage module 604, and obtaining the value corresponding to the to-be-queried key.

The data processing apparatus 600 is implemented by using the data processing system provided in FIG. 1A, FIG. 1B, or FIG. 1C. The index creation module 601, the data query module 602, the index storage module 603, and the data table storage module 604 may be software modules, may be deployed on a same computing device, or may be deployed on different computing devices.

Figure 16:
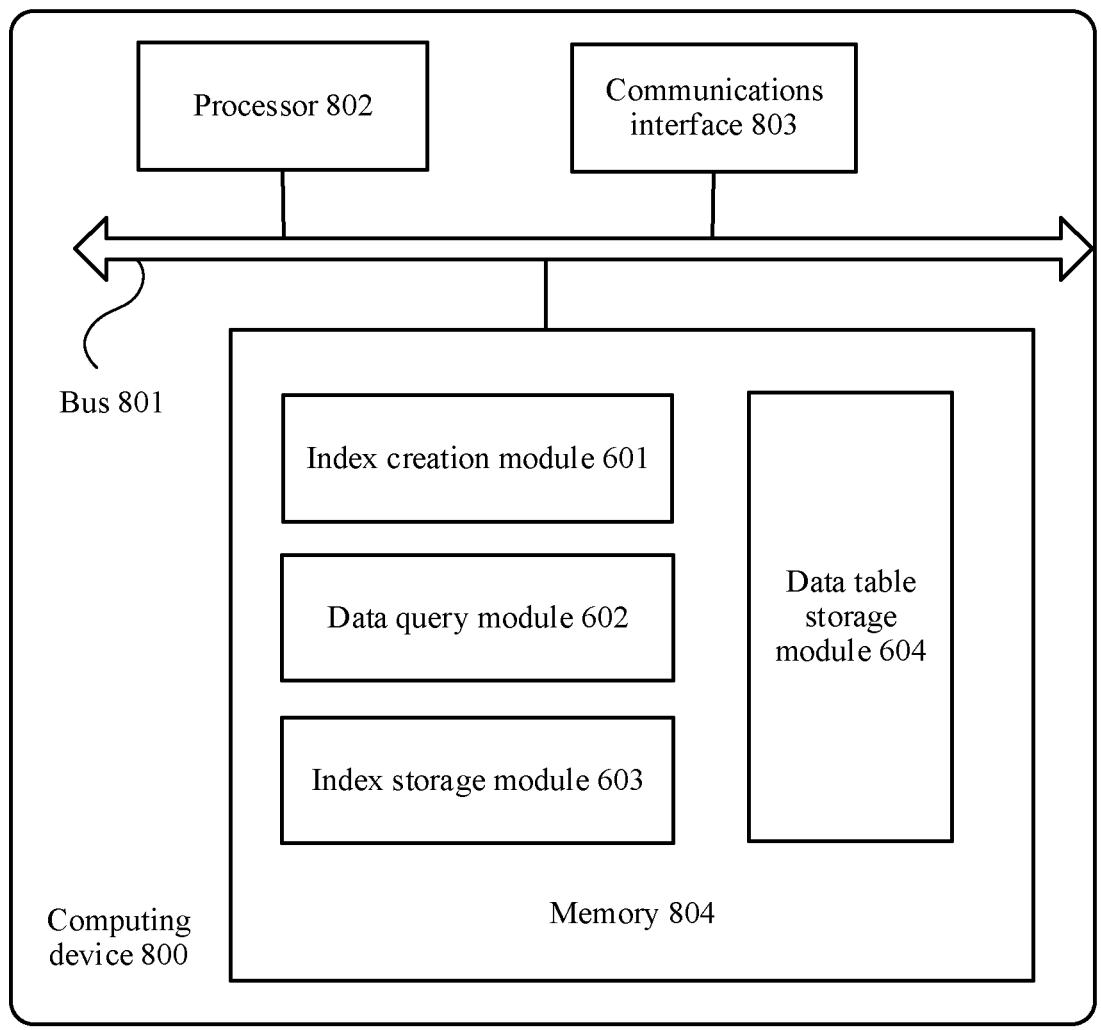
FIG. 16 is a schematic diagram of a structure of a computing device.

When the index creation module 601, the data query module 602, the index storage module 603, and the data table storage module 604 are deployed on the same computing device 800, as shown in FIG. 16, the computing device 800 includes a bus 801, a processor 802, a communications interface 803, and a memory 804. The processor 802, the memory 804, and the communications interface 803 communicate with each other by using the bus 801. The computing device 800 communicates with another computing device 800 by using the communications interface 803.

The processor 802 may be a CPU. The memory 804 may include a volatile memory, for example, a (RAM. The memory may further include a non-volatile memory, for example, a read-only memory (ROM), a flash memory, an HDD, or an SSD. The memory 804 stores executable code. The processor 802 executes the executable code to perform the method performed in FIG. 2 and FIG. 12. The memory 804 may further include another software module, such as an operating system, for running a process. The operating system may be LINUX, UNIX, WINDOWS, or the like.

The memory 804 of the computing device 800 stores code corresponding to each module of the data processing apparatus 600. The processor 802 executes the code to implement a function of each module of the data processing apparatus 600. The data storage module 604 may be a part of the memory 804, or a part of storage space provided in the memory 804.

Figure 17:
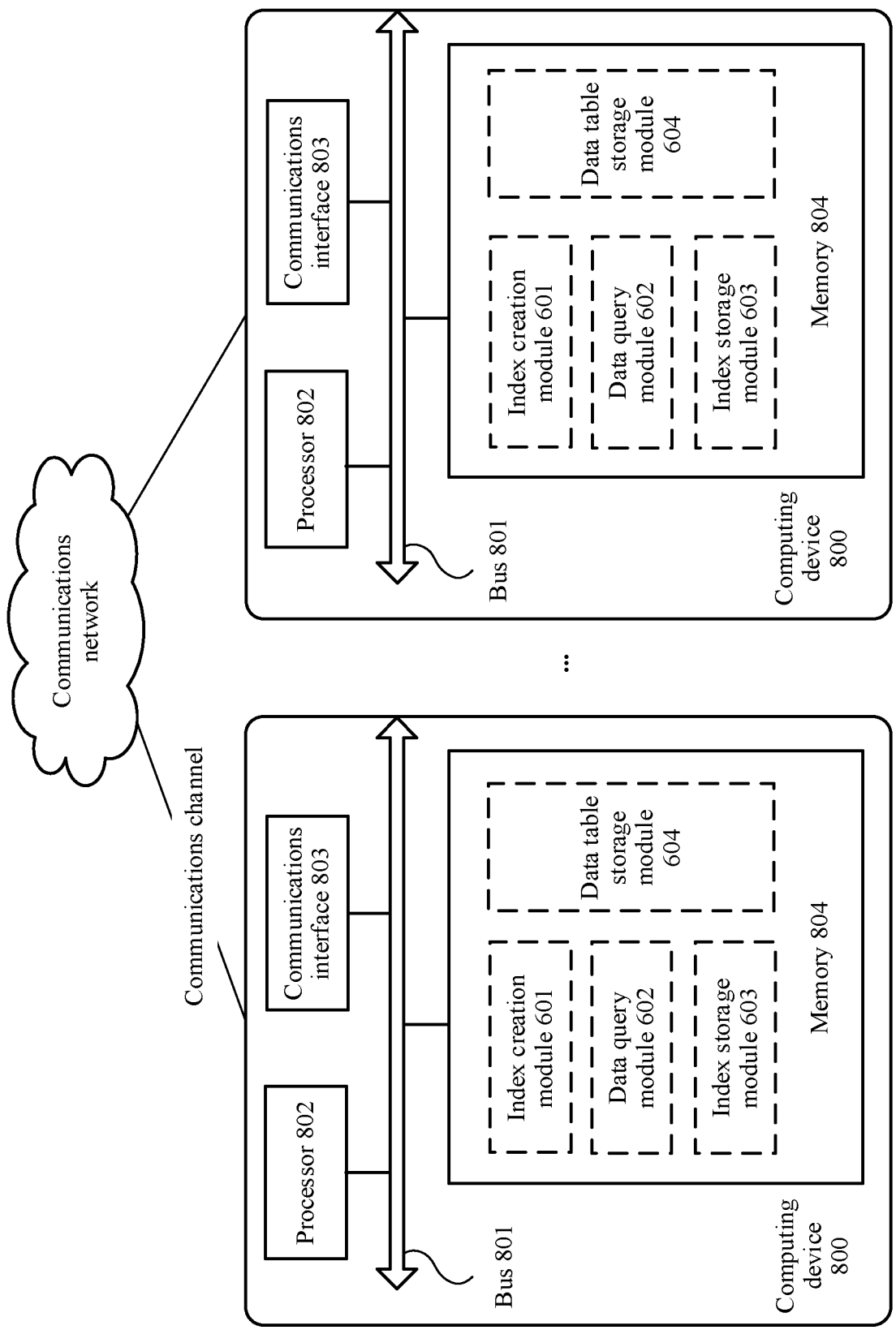
FIG. 17 a schematic diagram of a structure of another computing device system.

When the index creation module 601, the data query module 602, the index storage module 603, and the data table storage module 604 are deployed on the different computing devices, as shown in FIG. 17, the computing device system includes a plurality of computing devices 800. A communications channel is established between the computing devices 800 by using a communications network. Any one or more of the index creation modules 601, the data query module 602, the index storage module 603, and the data table storage module 604 run on each computing device 800.

Figure 18:
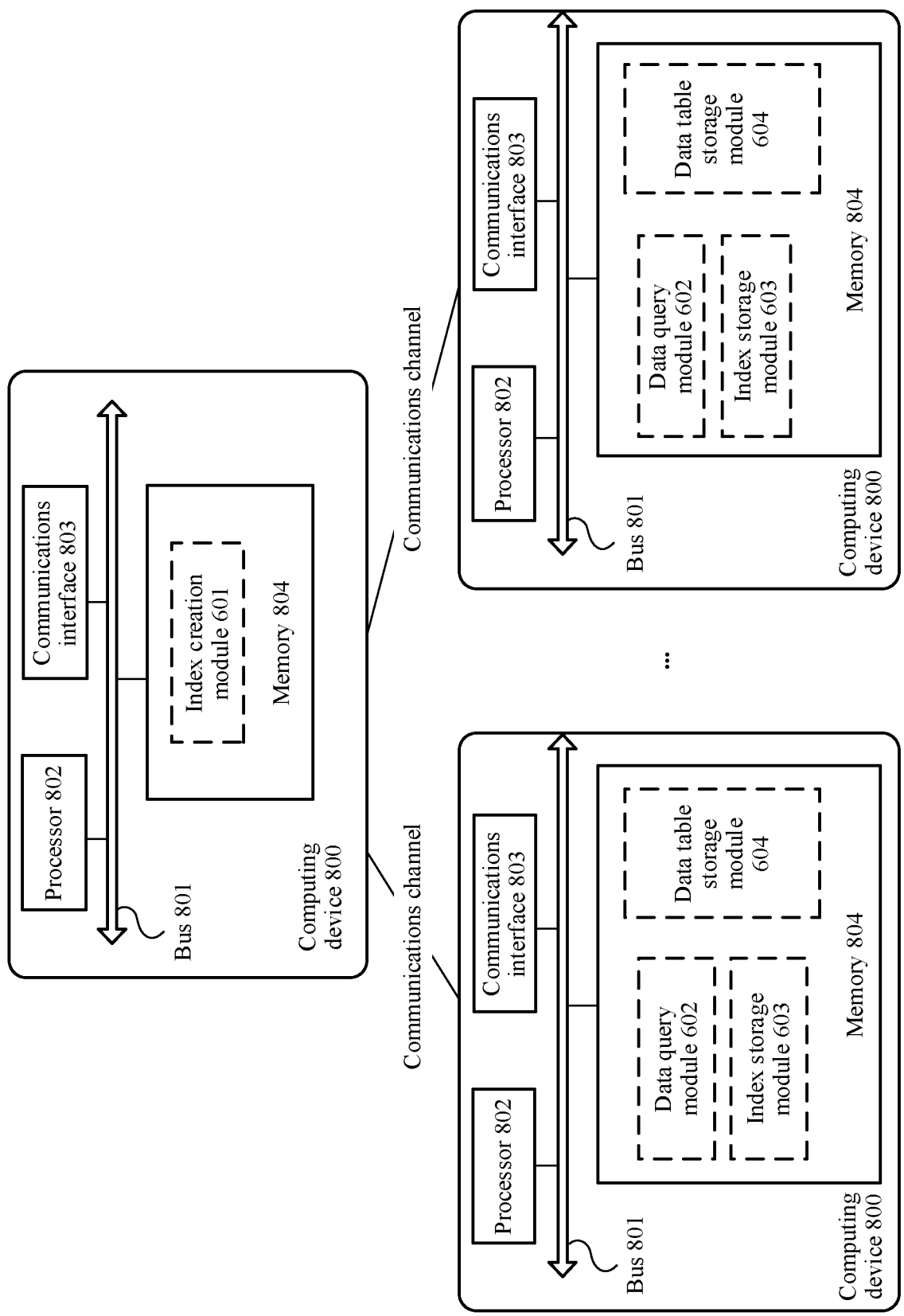
FIG. 18 is a schematic diagram of a structure of another computing device system.

With reference to FIG. 18, the following describes a deployment manner when the index creation module 601, the data query module 602, the index storage module 603, and the data table storage module 604 are deployed on the different computing devices. A process of establishing the index for the raw data table is usually performed at a comparatively low frequency. Therefore, in this deployment manner, one computing device 800 deployed with the index creation module 601 sorts and establishes the index for raw data tables stored in a plurality of computing devices 800 deployed with the data table storage modules 604, and respectively stores the ordered raw data table and the established index in the data table storage module 604 and the index storage module 603 of each computing device 800. Subsequently, a user sends, by using a terminal, a key of the to-be-queried data to the computing device 800 deployed with the data table storage module 604, and obtains, by using the data query module 602, the value corresponding to the to-be-queried key. In FIG. 18, the computing device 800 deployed with the index creation module 601 is the processing node in FIG. 1C, and a remaining computing device 800 in FIG. 18 is the storage node in FIG. 1C.

In another case, the index creation module 601, the data query module 602, the index storage module 603, and the data table storage module 604 may be hardware modules, or some may be the software modules and some may be hardware modules. The index creation module 601, the data query module 602, the index storage module 603, and the data table storage module 604 may be deployed on a same computing device, or may be deployed on different computing devices. The hardware module may be an integrated circuit, for example, an ASIC or a programmable logic device (PLD). The PLD may be a complex PLD (CPLD), a field-programmable gate array (FPGA), generic array logic (GAL), or any combination thereof.

Figure 19:
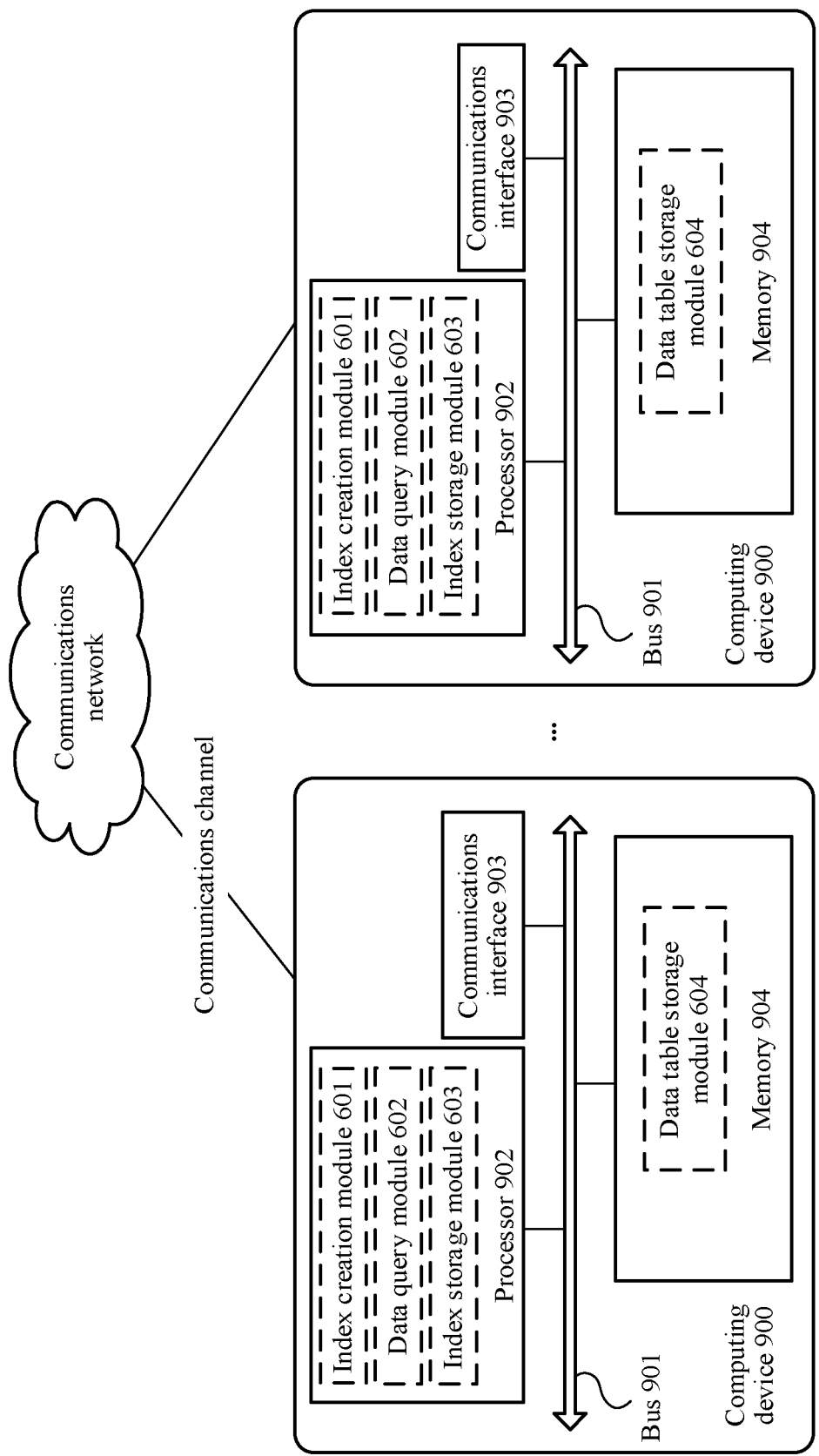
FIG. 19 is a schematic diagram of a structure of another computing device system.

As shown in FIG. 19, in this case, a system includes at least one computing device 900. Some or all of the index creation module 601, the data query module 602, the index storage module 603, and the data table storage module 604 are deployed on each computing device 900. The computing device 900 includes a bus 901, a processor 902, a communications interface 903, and a memory 904. The processor 902, the memory 904, and the communications interface 903 communicate with each other by using the bus 901. The computing device 900 communicates with another computing device 900 by using the communications interface 903. The processor 902 may include a CPU, include an integrated circuit, or include a CPU and an integrated circuit, and is specifically determined based on whether a module implemented by each processor 902 is a hardware module, a software module, or a software module and a hardware module. The processor 902 that implements only the software module includes the CPU. The processor 902 that implements only the hardware module includes the integrated circuit. The processor 902 deployed with the software module and the hardware module includes the CPU and the integrated circuit.

The index creation module 601, the data query module 602, and the index storage module 603 are parts of the software module. Referring to FIG. 16 to FIG. 18, the CPU included in the processor 902 executes the code stored in the memory 904. The index creation module 601, the data query module 602, and the index storage module 603 are parts of the hardware module, and are implemented by using the integrated circuit included in the processor 902.

A description corresponding to each of the accompanying drawings has a focus. For a part that is not described in detail in a procedure, refer to a related description of another procedure.

In the specification, claims, and accompanying drawings, the terms "first", "second", "third", "fourth", and the like (if existent) are intended to distinguish between similar objects but do not necessarily indicate a particular order or sequence.

All or some of the foregoing embodiments may be implemented by using software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, the procedure or the functions according to the embodiments are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, an SSD) or the like.

What is claimed is:

1. A data method for index establishment and comprising:
obtaining a raw data table comprising a plurality of pieces of raw data, wherein the pieces comprise first keys and values;
segmenting the pieces based on the first keys to obtain M raw data segments and M first mapping relationships, wherein the M first mapping relationships indicate first correspondences between M first keys and locations of the M first keys in the raw data table;
obtaining the M first keys;
segmenting the M first keys to obtain N first key segments and N second mapping relationships;
obtaining a to-be-queried key;
determining, based on the to-be-queried key and the N second mapping relationships, a first mapping relationship corresponding to the to-be-queried key; and
obtaining, based on the to-be-queried key and the first mapping relationship, a first location of the to-be-queried key in the raw data table,
wherein the N second mapping relationships indicate second correspondences between the M first keys and first identifiers of the M first mapping relationships.

2. The method of claim 1, wherein the M first mapping relationships comprise monotone functions, wherein the first keys are inputs of the monotone function, and wherein the locations are outputs of the monotone function.

3. The method of claim 1, wherein the N second mapping relationships comprise a monotone function, wherein the M first keys are inputs of the monotone function, and wherein the first identifiers are outputs of the monotone function.

4. The method of claim 1, further comprising:
obtaining N first keys of the N first key segments; and
segmenting the N first keys to obtain J first keys and J third mapping relationships,
wherein the J third mapping relationships indicate third correspondences between the M first keys and second identifiers of the N second mapping relationships.

5. The method of claim 1, further comprising:
further obtaining the raw data table from a database; and
storing the M first mapping relationships and the N second mapping relationships into a memory.

6. A computing device comprising:
a memory configured to store instructions; and
a processor coupled to the memory and configured to:
obtain a raw data table comprising a plurality of pieces of raw data, wherein the pieces comprise first keys and values;
segment the pieces based on the first keys to obtain M raw data segments and M first mapping relationships, wherein the M first mapping relationships indicate first correspondences between M first keys and locations of the M first keys in the raw data table;
obtain the M first keys;
segment the M first keys to obtain N first key segments and N second mapping relationships;

obtain a to-be-queried key;

determine, based on the to-be-queried key and the N second mapping relationships, a first mapping relationship corresponding to the to-be-queried key; and obtain, based on the to-be-queried key and the first mapping relationship, a first location of the to-be-queried key in the raw data table, wherein the N second mapping relationships indicate second correspondences between the M first keys and first identifiers of the M first mapping relationships.

7. The computing device of claim 6, wherein the M first mapping relationships comprise monotone functions, wherein the first keys are inputs of the monotone function, and wherein the locations are outputs of the monotone function.

8. The computing device of claim 6, wherein the N second mapping relationships comprise a monotone function, wherein the M first keys are inputs of the monotone function, and wherein the first identifiers are outputs of the monotone function.

9. The computing device of claim 6, wherein the processor is further configured to:

obtain N first keys of the N first key segments;

segment the N first keys to obtain J first keys and J third mapping relationships, wherein the J third mapping relationships indicate third correspondences between the M first keys and second identifiers of the N second mapping relationships; and store the J third mapping relationships into the memory.

10. The computing device of claim 6, wherein the processor is further configured to:

further obtain the raw data table from a database; and store the M first mapping relationships and the N second mapping relationships into the memory.

11. A computer program product comprising instructions that are stored on a non-transitory computer-readable medium and that, when executed by a processor, cause a computing device to:

obtain a raw data table comprising a plurality of pieces of raw data, wherein the pieces comprise first keys and values;

segment the pieces based on the first keys to obtain M raw data segments and M first mapping relationships, wherein the M first mapping relationships indicate first correspondences between M first keys and locations of the M first keys in the raw data table;

obtain the M first keys;

segment the M first keys to obtain N first key segments and N second mapping relationships;

obtain a to-be-queried key;

determine, based on the to-be-queried key and the N second mapping relationships, a first mapping relationship corresponding to the to-be-queried key; and obtain, based on the to-be-queried key and the first mapping relationship, a first location of the to-be-queried key in the raw data table, wherein the N second mapping relationships indicate second correspondences between the M first keys and first identifiers of the M first mapping relationships.

12. The computer program product of claim 11, wherein the M first mapping relationships comprise monotone functions, wherein the first keys are inputs of the monotone function, and wherein the locations are outputs of the monotone function.

13. The computer program product of claim 11, wherein the N second mapping relationships comprise a monotone function, wherein the M first keys are inputs of the monotone function, and wherein the first identifiers are outputs of the monotone function.

14. The computer program product of claim 11, wherein the instructions further cause the computing device to:

obtain N first keys of the N first key segments; and segment the N first keys to obtain J first keys and J third mapping relationships, wherein the J third mapping relationships indicate third correspondences between the M first keys and second identifiers of the N second mapping relationships.

15. The computer program product of claim 14, wherein the instructions further cause the computing device to store the J third mapping relationships into a memory.

16. The computer program product of claim 11, wherein the instructions further cause the computing device to further obtain the raw data table from a database.

17. The computer program product of claim 16, wherein the instructions further cause the computing device to store the M first mapping relationships and the N second mapping relationships into a memory.

* * * * *